(12) United States Patent
Shiokawa et al.

(10) Patent No.: US 11,238,559 B2
(45) Date of Patent: Feb. 1, 2022

(54) IMAGE PROCESSING METHOD AND IMAGE RECEIVING APPARATUS

(71) Applicant: Semiconductor Energy Laboratory Co., Ltd., Atsugi (JP)

(72) Inventors: Masataka Shiokawa, Isehara (JP); Kei Takahashi, Isehara (JP); Yuji Iwaki, Isehara (JP); Hiromichi Godo, Isehara (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 16/500,535

(22) PCT Filed: Apr. 9, 2018

(86) PCT No.: PCT/IB2018/052435
§ 371 (c)(1),
(2) Date: Oct. 3, 2019

(87) PCT Pub. No.: WO2018/193333
PCT Pub. Date: Oct. 25, 2018

(65) Prior Publication Data
US 2020/0051211 A1     Feb. 13, 2020

(30) Foreign Application Priority Data

Apr. 21, 2017   (JP) .............................. JP2017-084603

(51) Int. Cl.
*G06T 3/40*     (2006.01)
*G06T 5/00*     (2006.01)

(52) U.S. Cl.
CPC .......... *G06T 3/4053* (2013.01); *G06T 3/4046* (2013.01); *G06T 5/007* (2013.01); *G06T 2207/20208* (2013.01)

(58) Field of Classification Search
CPC ................. G06T 3/4053; G06T 3/4046; G06T 3/40–4092; G06T 2207/20084;
(Continued)

(56) References Cited

U.S. PATENT DOCUMENTS 8,358,307 B2    1/2013  Shiomi et al.
8,498,498 B2 *  7/2013  Hwang ................. G06T 3/4053
                                                382/284

(Continued)

FOREIGN PATENT DOCUMENTS

CN    001914926 A    2/2007
CN    101822064 A    9/2010
(Continued)

OTHER PUBLICATIONS

Kim, Sung Ye, and Preeti Bindu. "Realizing real-time deep learning-based super-resolution applications on integrated gpus." 2016 15th IEEE International Conference on Machine Learning and Applications (ICMLA). IEEE, 2016. (Year: 2016).*

(Continued)

*Primary Examiner* — Shefali D Goradia
(74) *Attorney, Agent, or Firm* — Robinson Intellectual Property Law Office; Eric J. Robinson

(57) ABSTRACT

An image processing method that generates high-resolution image data from low-resolution image data and an image receiving apparatus that is operated by the image processing method are provided.
In the image processing method that generates high-resolution image data from low-resolution image data, the low-resolution image data is divided to generate a plurality of first image data, among the plurality of first image data, one of two adjacent image data is second image data, and the other is third image data. Surroundings of the second image data are supplemented with pixel data to generate fourth
(Continued)

image data. The pixel data includes part of the third image data. A convolutional neural network using the fourth image data as an input is implemented, fifth image data is output from the convolutional neural network, and a plurality of the fifth image data is combined to generate high-resolution image data. The image receiving apparatus is operated by the image processing method.

4 Claims, 18 Drawing Sheets

(58) Field of Classification Search
CPC ........... G06T 2207/20021; G06T 5/007; G06T 2207/20208; H04N 7/0125; H04N 7/0117; G06N 3/02–088; G09G 2340/0442; G09G 2340/14; G09G 2340/0457; G09G 3/3688; G09G 3/3611; G09G 5/005; G09G 5/026
USPC .................................. 382/298–300, 156–158
See application file for complete search history.

(56) References Cited

U.S. PATENT DOCUMENTS

| | | | |
|---|---|---|---|
| 2003/0133605 A1* | 7/2003 | Tannhof | G06T 3/4046 382/156 |
| 2007/0133680 A1 | 6/2007 | Kimoto | |
| 2010/0002130 A1 | 1/2010 | Kamio | |
| 2010/0208827 A1 | 8/2010 | Divorra Escoda et al. | |
| 2011/0043526 A1* | 2/2011 | Shiomi | H04N 7/0125 345/428 |
| 2014/0254952 A1* | 9/2014 | Kimiyama | G09G 5/001 382/284 |
| 2016/0328828 A1* | 11/2016 | Zhang | H04N 13/128 |
| 2016/0343452 A1 | 11/2016 | Ikeda et al. | |
| 2017/0116512 A1 | 4/2017 | Kurokawa | |
| 2018/0013978 A1* | 1/2018 | Duan | G09G 5/14 |
| 2018/0150740 A1* | 5/2018 | Wang | G06K 9/2054 |

FOREIGN PATENT DOCUMENTS

| | | |
|---|---|---|
| CN | 101952854 A | 1/2011 |
| CN | 105141876 A | 12/2015 |
| CN | 106127684 A | 11/2016 |
| JP | 11-017934 A | 1/1999 |
| JP | 2005-346639 A | 12/2005 |
| WO | WO-2009/051719 | 4/2009 |
| WO | WO-2009/130820 | 10/2009 |

OTHER PUBLICATIONS

Chua, Kah Keong, and Yong HaurTay. "Enhanced image super-resolution technique using convolutional neural network." International Visual Informatics Conference. Springer, Cham, 2013. (Year: 2013).*
Wang, Zhangyang, et al. "Self-tuned deep super resolution." 2015 IEEE Conference on Computer Vision and Pattern Recognition Workshops (CVPRW). IEEE, 2015. (Year: 2015).*
Dong, Chao, et al. "Learning a deep convolutional network for image super-resolution." European conference on computer vision. Springer, Cham, 2014. (Year: 2014).*
Huang, Dongdong, and Heng Liu. "A short survey of image super resolution algorithms." Journal of Computer Science Technology Updates 2.2 (2015): 19-29. (Year: 2015).*
Chinese Office Action (Application No. 201880025822.1) dated Oct. 30, 2020.
Ohtani.S et al., "Super Resolution Using Four-Parallel Convolutional Neural Network", Early published thesis of IEICE transactions D, Jan. 15, 2016, pp. 1-6, IEICE(The Institute of Electronics, Information and Communication Engineers).
Dai.A et al., "Basic Study of Visual Quality Improvement for Super-Resolution Images", IMPS(Image Media Processing Symposium), Nov. 18, 2015, vol. 20, pp. 130-131.
International Search Report (Application No. PCT/IB2018/052435) dated Jul. 10, 2018.
Written Opinion (Application No. PCT/IB2018/052435) dated Jul. 10, 2018.
Arima.Y et al., "A Self-Learning Neural Network Chip with 125 Neurons and 10K Self-Organization Synapses", IEEE Journal of Solid-State Circuits, Apr. 1, 1991, vol. 26, No. 4, pp. 607-611.
Kawashima.S et al., "13.3-in. 8K × 4K 664-ppi OLED Display Using CAAC-OS FETs", SID Digest '14 : SID International Symposium Digest of Technical Papers, Jun. 3, 2014, pp. 627-630.

* cited by examiner

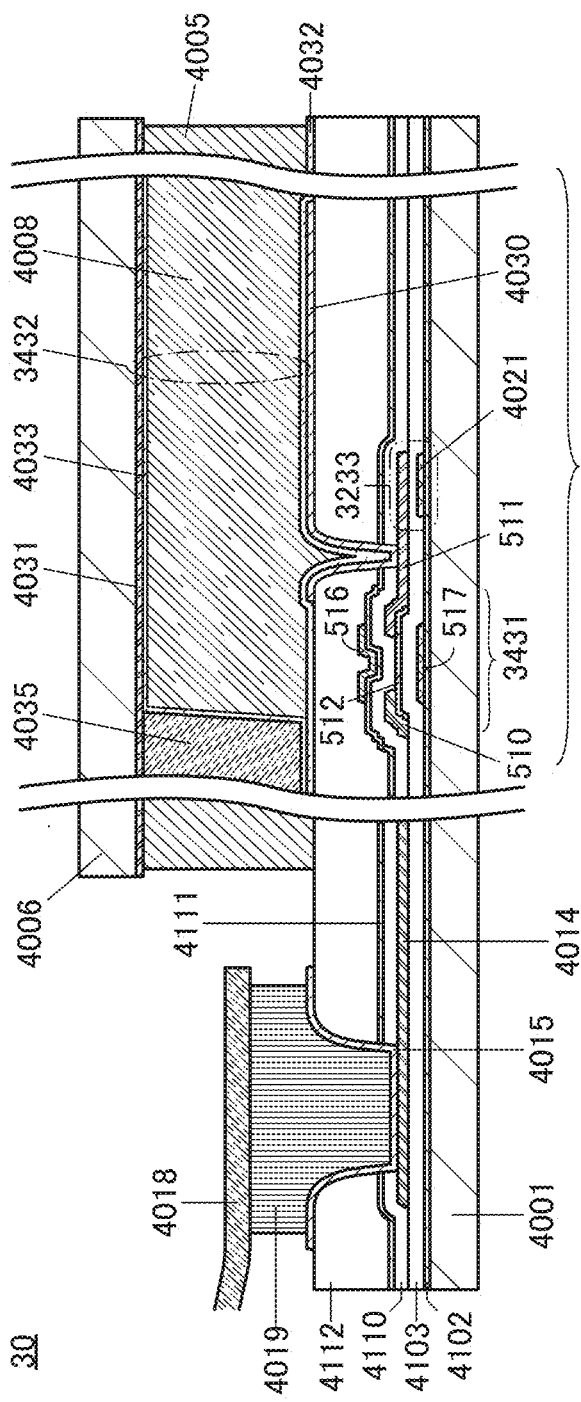
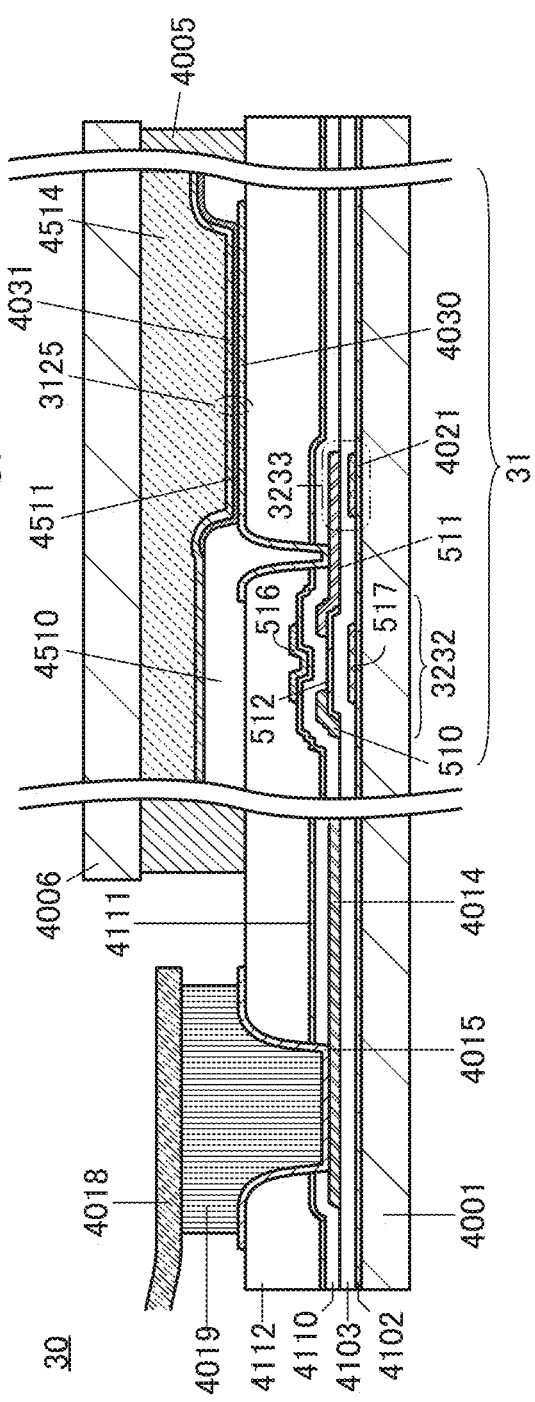
FIG. 10A
FIG. 10B

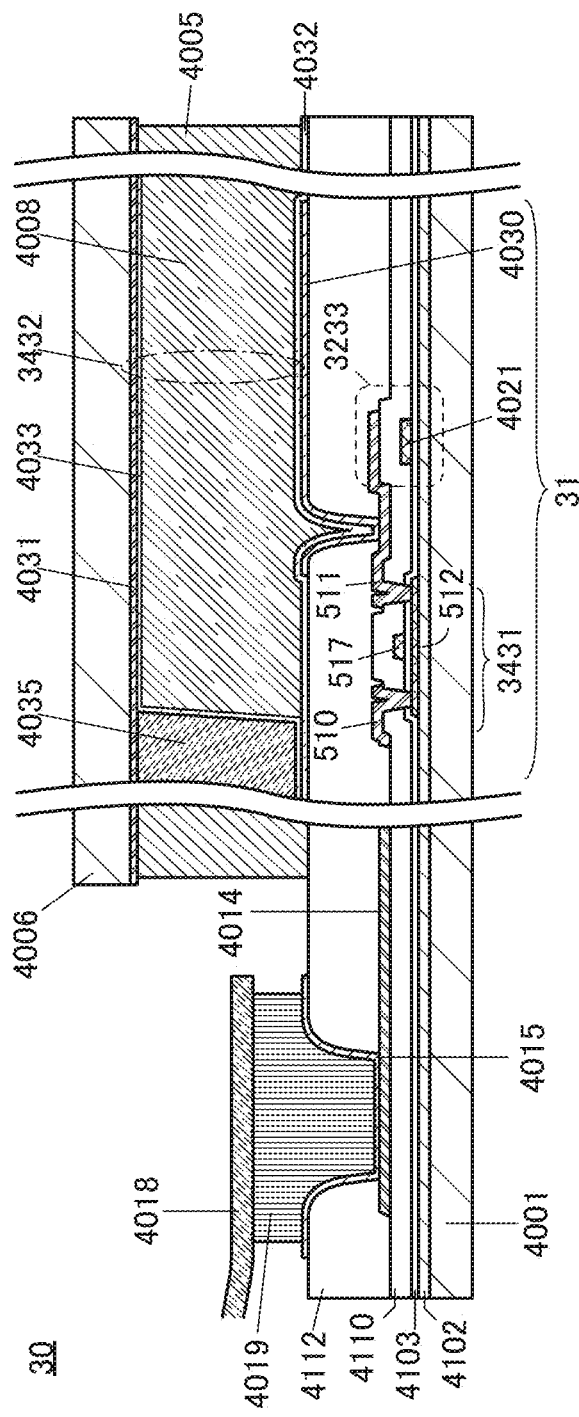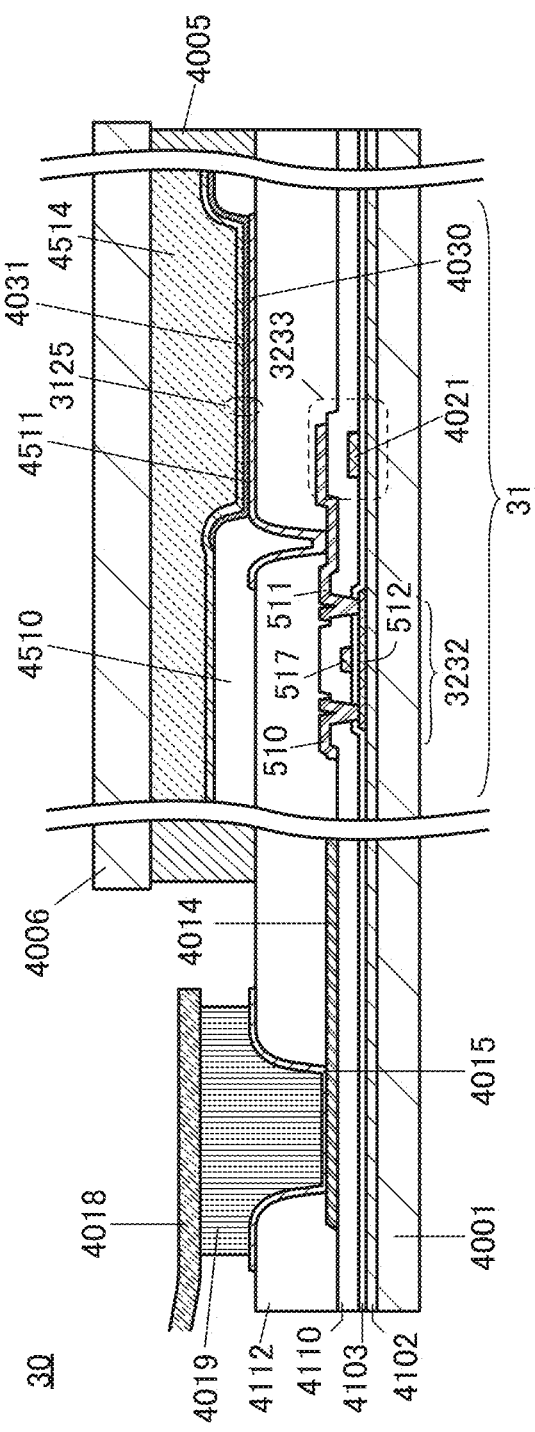

IMAGE PROCESSING METHOD AND IMAGE RECEIVING APPARATUS

TECHNICAL FIELD

One embodiment of the present invention relates to an image processing method and an image receiving apparatus operated by the image processing method.

One embodiment of the present invention relates to a semiconductor device. Note that in this specification and the like, a semiconductor device generally means a device that can function by utilizing semiconductor characteristics. A display device, a light-emitting device, a memory device, an electro-optical device, a power storage device, a semiconductor circuit, and an electronic device may include the semiconductor device.

Note that one embodiment of the present invention is not limited to the above technical field. The technical field of the invention disclosed in this specification and the like relates to an object, a method, or a manufacturing method. Alternatively, one embodiment of the present invention relates to a process, a machine, manufacture, or a composition of matter. Therefore, more specific examples of the technical field of one embodiment of the present invention disclosed in this specification include a semiconductor device, a display device, a liquid crystal display device, a light-emitting device, a power storage device, an imaging device, a memory device, a processor, an electronic device, a method of driving any of them, a method of manufacturing any of them, a method of inspecting any of them, and their systems.

BACKGROUND ART

There has been a demand for seeing high-resolution images due to an increase in screen size of televisions (TV). In Japan, 4K practical broadcasting utilizing communication satellite (CS), cable television, and the like started in 2015, and 4K and 8K test broadcasting utilizing broadcast satellite (BS) started in 2016. 8K practical broadcasting is planned to start in the future. Therefore, a variety of electronic devices compatible with 8K broadcasting are being developed (Non-Patent Document 1). In 8K practical broadcasting, there are plans to employ 4K broadcasting and 2K broadcasting (full high vision broadcasting) together.

The resolution (the number of horizontal and perpendicular pixels) of an image in 8K broadcasting is 7680×4320, which is 4 times as high as that of 4K broadcasting (3840×2160) and 16 times as high as that of 2K broadcasting (1920×1080). Therefore, a person who sees an image in 8K broadcasting is expected to be able to feel a higher realistic sensation than a person who sees an image in 2K broadcasting, an image in 4K broadcasting, or the like.

Not only televisions but also a variety of electronic devices that incorporate artificial intelligence utilizing an artificial neural network or the like are being developed. With the use of an artificial neural network, computers with higher performance than conventional von Neumann computers are expected to be achieved, and in recent years, a variety of researches for building artificial neural networks in electronic circuits have been carried out. Non-Patent Document 2 discloses a technology relating to a chip having a self-learning function with an artificial neural network.

Furthermore, Patent Document 1 discloses an invention in which weight data necessary for computation with an artificial neural network is retained in a memory device including a transistor that contains an oxide semiconductor in its channel formation region.

REFERENCES

Patent Document

[Patent Document 1] United States Patent Application Publication No. 2016/0343452

Non-Patent Documents

[Non-Patent Document 1] S. Kawashima, et al., "13.3-In. 8K×4K 664-ppi OLED Display Using CAAC-OS FETs," SID 2014 Digest, pp. 627-630.

[Non-Patent Document 2] Yutaka Arima et al., "A Self-Learning Neural Network Chip with 125 Neurons and 10K Self-Organization Synapses," IEEE Journal of Solid-State Circuits, Vol. 26, No. 4, April 1991, pp. 607-611.

SUMMARY OF THE INVENTION

Problems to be Solved by the Invention

Since high-resolution images such as 8K images have a large amount of data, the communication load when transmitting data from a broadcast station to a receiver is large. In order to reduce the communication load, a technology in which a low-resolution image is broadcast by a broadcast station and the resolution is increased on the receiver side which receives the broadcast is needed.

An object of one embodiment of the present invention is to provide an image processing method of generating high-resolution image data from low-resolution image data. Another object of one embodiment of the present invention is to provide an image processing method with little amount of computation. Another object of one embodiment of the present invention is to provide an image receiving apparatus that can display high-quality images. Another object of one embodiment of the present invention is to provide an image receiving apparatus with high reliability. Another object of one embodiment of the present invention is to provide an image receiving apparatus with low power consumption. Another object of one embodiment of the present invention is to provide an image receiving apparatus that operates at high speed. Another object of one embodiment of the present invention is to provide a novel image processing method, a novel image receiving apparatus, and a novel semiconductor device.

Note that the objects of one embodiment of the present invention are not limited to the objects mentioned above. The objects mentioned above do not preclude the existence of other objects. The other objects are objects that are not described in this section and will be described below. The other objects not described in this section will be apparent from the description of the specification, the drawings, and the like and can be derived from the description by those skilled in the art. One embodiment of the present invention achieves at least one of the descriptions mentioned above and other objects. One embodiment of the present invention need not solve all the aforementioned descriptions and the other objects.

Means for Solving the Problems

One embodiment of the present invention is an image processing method that generates high-resolution image data from low-resolution image data. The low-resolution image data is divided to generate a plurality of first image data, and among the plurality of first image data, one of two adjacent image data is second image data, and the other is third image data. Surroundings of the second image data are supplemented with pixel data to generate fourth image data. The pixel data includes part of the third image data. A convolutional neural network using the fourth image data as an input is implemented, fifth image data is output from the convolutional neural network, and a plurality of the fifth image data is combined to generate high-resolution image data.

In the above embodiment, the resolution of the fifth image data may be $n^2$ times (n is an integer greater than or equal to 2) as high as that of the first image data.

One embodiment of the present invention is an image receiving apparatus that receives low-resolution image data and displays a high-resolution image. The low-resolution image data is divided to generate a plurality of first image data, and among the plurality of first image data, one of two adjacent image data is second image data, and the other is third image data. Surroundings of the second image data are supplemented with pixel data to generate fourth image data. The pixel data includes part of the third image data. A convolutional neural network using the fourth image data as an input is implemented, fifth image data is output from the convolutional neural network, and a plurality of the fifth image data is combined to display the high-resolution image.

In the above embodiment, the resolution of the fifth image data may be $n^2$ times (n is an integer of greater than or equal to 2) as high as that of the first image data.

One embodiment of the present invention is an image receiving apparatus that receives low-resolution image data and displays a high-resolution image; the image receiving apparatus includes a plurality of circuits and a display panel. The low-resolution image data is divided into a plurality of first image data, the plurality of circuits each convert one of the plurality of first image data into second image data by using a convolutional neural network; the second image data is of a higher resolution than the first image data, and the display panel combines a plurality of the second image data to display a high-resolution image.

In the above embodiment, the plurality of circuits may include first to N-th (N is an integer greater than or equal to 2) circuits, and the low-resolution image data may be divided into M×N (M is an integer greater than or equal to 1) first image data.

Effects of the Invention

According to one embodiment of the present invention, an image processing method of generating high-resolution image data from low-resolution image data can be provided. According to one embodiment of the present invention, an image processing method with little amount of computation can be provided. According to one embodiment of the present invention, an image receiving apparatus that can display high-quality images can be provided. According to one embodiment of the present invention, an image receiving apparatus with high reliability can be provided. According to one embodiment of the present invention, an image receiving apparatus with low power consumption can be provided. According to one embodiment of the present invention, an image receiving apparatus that operates at high speed can be provided. According to one embodiment of the present invention, a novel image processing method, a novel image receiving apparatus, and a novel semiconductor device can be provided.

Note that the effects of one embodiment of the present invention are not limited to the effects mentioned above. The effects described above do not preclude the existence of other effects. The other effects are effects that are not described in this section and will be described below. The other effects not described in this section will be apparent from the description of the specification, the drawings, and the like and can be derived from the description by those skilled in the art. One embodiment of the present invention has at least one of the effects mentioned above and other effects. Therefore, one embodiment of the present invention does not have the effects mentioned above in some cases.

BRIEF DESCRIPTION OF THE DRAWINGS

FIG. 10 Cross-sectional diagrams illustrating structural examples of a display panel.

FIG. 11 Cross-sectional diagrams illustrating structural examples of a display panel.

MODES FOR CARRYING OUT THE INVENTION

Figure 1A:
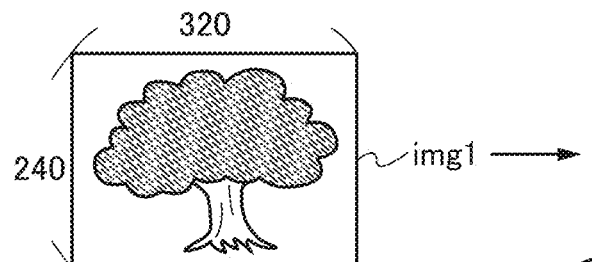
FIG. 1 Diagrams illustrating an example of an image processing method.

In this specification and the like, an artificial neural network (ANN, hereinafter referred to as neural network) generally means a model that imitates a biological neural network. In general, a neural network has a structure in which units that imitate neurons are connected to each other through a unit that imitates a synapse.

The strength of connection between synapses (connection between neurons), (also referred to as a weight coefficient), can be changed when the neural network is provided with existing information. The processing for determining the connection strength by providing a neural network with existing information is called "learning" in some cases.

Furthermore, when a neural network in which "learning" is performed (connection strength is determined) is provided with any type of information, new information can be output on the basis of the connection strength. The processing for output of new information on the basis of information provided and the connection strength in a neural network is called "inference" or "recognition" in some cases.

Examples of a neural network model include a Hopfield type, a hierarchical neural type, and the like. In particular, a neural network with a multilayer structure is referred to as a "deep neural network" (DNN), and machine learning using the deep neural network is referred to as "deep learning". Note that in DNN, a full connected-neural network (FC-NN), a convolutional neural network (CNN), a recurrent neural network (RNN), and the like are included.

In this specification and the like, a metal oxide means an oxide of a metal in a broad expression. Metal oxides are classified into an oxide insulator, an oxide conductor (including a transparent oxide conductor), an oxide semiconductor (also simply referred to as an OS), and the like. For example, when a metal oxide is used in a semiconductor layer of a transistor, the metal oxide is referred to as an oxide semiconductor in some cases. In the case where a metal oxide is included in a channel formation region of a transistor having at least one of an amplifying function, a rectifying function, and a switching function, the metal oxide can be referred to as a metal oxide semiconductor, or OS for short. In addition, in the case where an OS FET (or OS transistor) is mentioned, the OS FET can also be referred to as a transistor including a metal oxide or an oxide semiconductor.

An impurity in a semiconductor refers to, for example, elements other than the main elements that compose a semiconductor layer. For instance, an element with a concentration of lower than 0.1 atomic percent is an impurity. If an impurity is contained, for example, a DOS (Density of States) may be formed in the semiconductor, the carrier mobility may be decreased, or the crystallinity may be decreased. In the case where the semiconductor is an oxide semiconductor, examples of an impurity which changes the characteristics of the semiconductor include Group 1 elements, Group 2 elements, Group 13 elements, Group 14 elements, Group 15 elements, transition metals other than the main components, and the like; specifically, for example, hydrogen (also included in water), lithium, sodium, silicon, boron, phosphorus, carbon, nitrogen, and the like. In the case of an oxide semiconductor, oxygen vacancies may be formed by entry of impurities such as hydrogen, for example. Furthermore, when the semiconductor is a silicon layer, examples of an impurity which changes the characteristics of the semiconductor include oxygen, Group 1 elements except hydrogen, Group 2 elements, Group 13 elements, Group 15 elements, and the like.

In this specification and the like, ordinal numbers such as "first", "second", and "third" are used in order to avoid confusion among components. Thus, the terms do not limit the number of components. In addition, the terms do not limit the order of components. For example, in this specification and the like, a "first" component in one embodiment can be a "second" component in the other embodiments or claims. Also, for example, in this specification and the like, a "first" component in one embodiment can be omitted in the other embodiments or claims.

The embodiments are described with reference to the drawings. Note that the embodiments can be implemented in many different modes, and it will be readily appreciated by those skilled in the art that the modes and details can be changed in various ways without departing from the spirit and scope thereof. Thus, the present invention should not be interpreted as being limited to the description of the embodiments. Note that in the structures of the embodiments of the invention, the same portions or portions having similar functions are denoted by the same reference numerals in different drawings, and description thereof is not repeated.

Also, in this specification and the like, terms for describing arrangement such as "over" and "under" are used for convenience in describing a positional relation between components with reference to drawings. Furthermore, the positional relation between components is changed as appropriate in accordance with a direction in which each component is depicted. Therefore, the terms for explaining arrangement are not limited to those described in the specification, and can be changed to other terms as appropriate depending on the situation.

The terms "over" and "under" do not necessarily mean directly over or directly under and directly in contact in the description of positional relationship between components. For example, the expression "an electrode B over an insulating layer A" does not necessarily mean that the electrode B is formed over and directly in contact with the insulating layer A and does not exclude the case where another component is provided between the insulating layer A and the electrode B.

In the drawings, the size, the layer thickness, or the region is shown arbitrarily for convenience of description. Therefore, they are not necessarily limited to the illustrated scale. Note that the drawings are schematically shown for clarity, and embodiments of the present invention are not limited to shapes, values, or the like shown in the drawings. For example, variation in signal, voltage, or current due to noise or variation in signal, voltage, or current due to a difference in timing, or the like can be included.

Also, in the drawings, some components might not be illustrated for clarity.

In the drawings, the same elements, elements having similar functions, elements with the same material, elements formed at the same time, or the like are sometimes denoted by the same reference numerals, and repeated description thereof is omitted in some cases.

In this specification and the like, when describing the connection relation of a transistor, one of a source and a drain is denoted as "one of a source and a drain" and the other of the source and the drain is denoted as "the other of the source and the drain". This is because the source and the drain of a transistor change depending on the structure, operating conditions, or the like of the transistor. Note that the source or the drain of the transistor can also be referred to as a source (or drain) terminal, a source (or drain) electrode, or the like as appropriate depending on the situation. In this specification and the like, in the case where a transistor has two or more gates, these gates are referred to as a front gate and a back gate in some cases. The term "front gate" can be used interchangeably with a simple term "gate". The term "back gate" can be used interchangeably with a simple term "gate". Note that a bottom gate is a terminal that is formed before a channel formation region when fabricating a transistor, and a "top gate" is a terminal that is formed after the channel formation region when fabricating a transistor.

A transistor includes three terminals called a gate, a source, and a drain. The gate is a terminal that functions as a control terminal for controlling the conduction state of the transistor. In the two input/output terminals functioning as a source or a drain, depending on the type of the transistor and the level of potential supplied to each of the terminals, one of the two input/output terminals functions as the source and the other functions as the drain. Therefore, the terms source and drain can be used interchangeably in this specification and the like.

Furthermore, in this specification and the like, the terms "electrode" and "wiring" do not functionally limit these components. For example, an "electrode" is sometimes used as part of a "wiring", and vice versa. Moreover, the terms "electrode" and "wiring" also include the case where a plurality of "electrodes" or "wirings" are formed in an integrated manner and the like.

Furthermore, in this specification and the like, voltage and potential can be interchanged with each other as appropriate. Voltage refers to a potential difference from a reference potential. For example, given that the reference potential is a ground potential, voltage can be interchanged with potential. The ground potential does not necessarily mean 0 V. Note that potential is relative, and potential supplied to a wiring or the like is sometimes changed depending on the reference potential.

Note that in this specification and the like, the terms such as "film" and "layer" can be interchanged with each other depending on the case or circumstances. For example, the term "conductive layer" can be changed into the term "conductive film" in some cases. Also, for example, the term "insulating film" can be changed into the term "insulating layer" in some cases. Moreover, depending on the case or circumstances, the terms such as "film" and "layer" can be interchanged with another term without using the terms "film" and "layer". For example, the term "conductive layer" or "conductive film" can be changed into the term "conductor" in some cases. Also, for example, the term "insulating layer" or "insulating film" can be changed into the term "insulator" in some cases.

Note that in this specification and the like, the terms such as "wiring", "signal line", and "power supply line" can be interchanged with each other depending on the case or circumstances. For example, the term "wiring" can be changed into the term "signal line" in some cases. Also, for example, the term "wiring" can be changed into the term such as "power supply line" in some cases. Conversely, the terms such as "signal line" and "power supply line" can be changed into the term "wiring" in some cases. The term such as "power supply line" can be changed into term such as "signal line" in some cases. Conversely, the term such as "signal line" can be changed into the term "power supply line" in some cases. The term "potential" that is applied to a wiring can be changed into the term such as "signal" depending on circumstances or conditions in some cases. Conversely, the term such as "signal" can be changed into the term "potential" in some cases.

The structure described in each embodiment can be combined with the structures described in the other embodiments as appropriate to constitute one embodiment of the present invention. In addition, in the case where a plurality of structural examples are described in one embodiment, the structural examples can be combined with each other as appropriate.

Note that a content (or part thereof) described in one embodiment can be applied to, combined with or replaced with another content (or part thereof) described in the same embodiment or at least a content (or part thereof) described in one or a plurality of the other embodiments, for example.

Note that a content described in an embodiment is a content in each embodiment that is described with reference to a variety of diagrams or described with text disclosed in the specification.

By combining a drawing (or part thereof) described in one embodiment with another part of the drawing, a different drawing (or part thereof) described in the embodiment, or at least a drawing (or part thereof) described in one or a plurality of embodiments, more drawings can be formed.

Embodiment 1

In this embodiment, one example of an image processing method of one embodiment of the present invention will be described.

<Example of Image Processing Method>

One embodiment of the present invention relates to, for example, an image processing method for increasing the resolution of image data. For example, image data transmitted through airwaves of satellite broadcasting or radio towers is received by an image receiving apparatus such as a television, and the resolution of the received image data is increased, for example, using a neural network, especially CNN. An image receiving apparatus corresponding to an image processing method of one embodiment of the present invention can display an image corresponding to image data with increased resolution. For example, image data with a resolution (320×240) corresponding to QVGA (Quarter Video Graphics Array) can be converted to image data with a resolution (640×480) corresponding to VGA. For example, image data with a resolution corresponding to VGA can be converted to image data with a resolution corresponding to Quad-VGA (1280×960). For example, image data with a resolution corresponding to 2K (1920×1080) can be converted to image data with a resolution corresponding to 4K (3840×2160). For example, image data with a resolution corresponding to 4K can be converted to image data with a resolution corresponding to 8K (7680×4320). For example, image data with a resolution corresponding to 2K can be converted to image data with a resolution corresponding to 8K.

In an image processing method of one embodiment of the present invention, image data received by an image receiving apparatus is divided, and each divided image data is supplemented with data corresponding to the adjacent image data. Then, the resolution of the image data is increased, and each image data with increased resolution is combined. By performing processing in which the image data is divided and the resolution is then increased, even when the amount of the image data received by the image receiving apparatus is increased, the amount of computation needed to perform processing to increase the resolution of the image data can be prevented from increasing significantly. Furthermore, by supplementing data corresponding to the adjacent image data, a connection portion of the divided image data which have been combined can be made less visible. Thus, high-quality image data can be generated by the image processing method of one embodiment of the present invention.

FIGS. 1(A), 1(B), 1(C), 1(D), and 1(E) are diagrams illustrating a method of increasing the resolution of image data, which is an image processing method of one embodiment of the present invention. Specifically, they are diagrams illustrating a method of converting image data with a resolution corresponding to QVGA (320×240) to image data with a resolution corresponding to VGA (640×480).

Image data img1 illustrated in FIG. 1(A) represents image data before the resolution is increased, and the resolution is 320×240. For the image data img1, image data transmitted by airwaves of satellite broadcasting or radio towers can be used, for example.

Figure 1B:
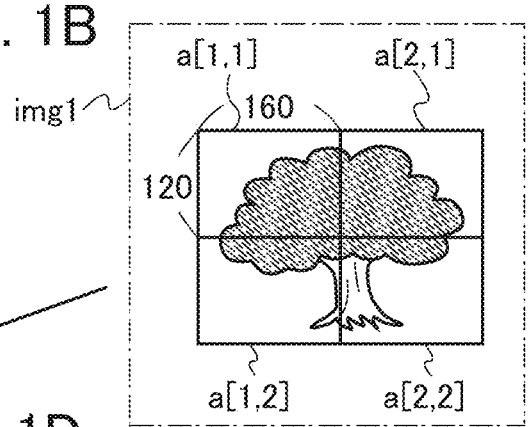

In an image processing method of one embodiment of the present invention, first, the image receiving apparatus receives the image data img1, and the received image data img1 is divided into a matrix. FIG. 1(B) illustrates the case where the image data img1 is divided into 2×2. In FIG. 1(B), the upper left image data is denoted by image data a[1,1], the upper right image data is denoted by image data a[2,1], the bottom left image data is denoted by image data a[1,2], and the bottom right image data is denoted by image data a[2,2]. Note that in this specification and the like, other image data are also distinguished with similar expressions in some cases. The resolution of each of the image data a[1,1] to the image data a[2,2] is 160×120 (¼ of 320×240).

Figure 1C:
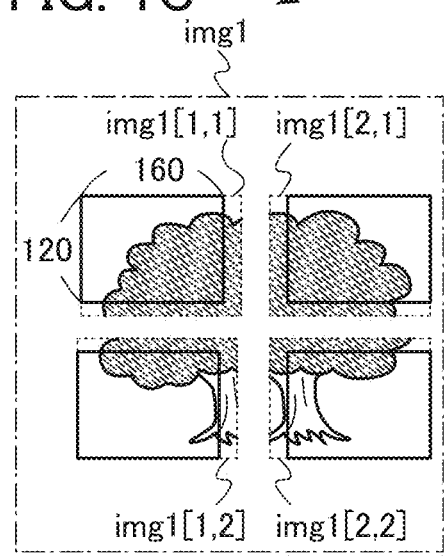

FIG. 1(C) illustrates the image data img1 which has been divided. In an image processing method of one embodiment of the present invention, each of image data a[1,1] to the image data a[2,2] is supplemented with a part of an adjacent image data a to divide the image data img1. In FIG. 1(C), the dashed line portions illustrate image data with which the image data a[1,1] to the image data a[2,2] are supplemented.

As shown in FIGS. 1(B) and 1(C), for example, the image data img1[1,1] which has been divided is supplemented outside the boundary of the image data a[1,1] with part of the image data a[2,1], part of the image data a[1,2], and part of the image data a[2,2], which are image data adjacent to the image data a[1,1]. That is, the resolution of the image data img1[1,1] becomes higher than the resolution of the image data a[1,1], which is 160×120. Note that image data img1[2,1], image data img1[1,2], and image data img1[2,2] are also generated by a similar method. Accordingly, the image data img1 is divided into the image data img1[1,1], the image data img1[2,1], the image data img[1,2], and the image data img1[2,2].

Figure 1D:
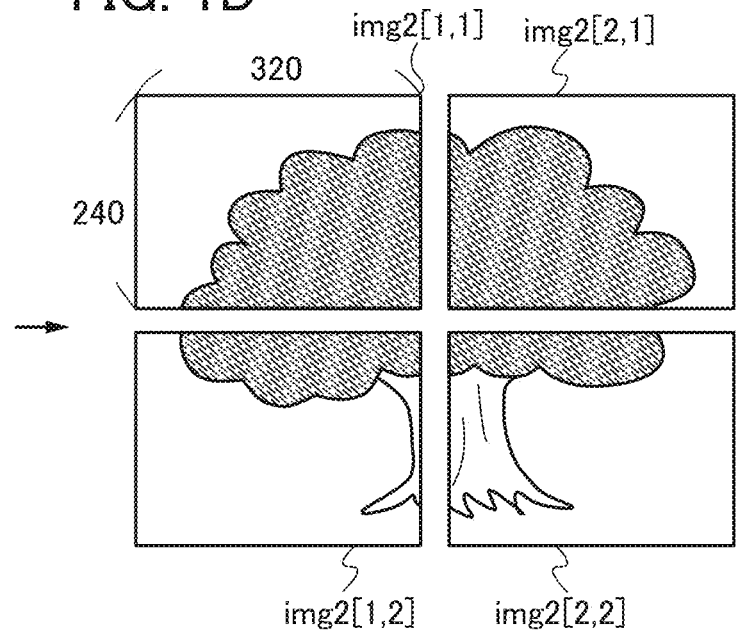

Next, processing to increase resolution (upconversion) is performed on each of the image data img1[1,1] to the image data img1[2,2]. FIG. 1(D) illustrates image data img2[1,1], image data img2[2,1], image data img2[1,2], and image data img2[2,2] which are image data that have been upconverted. FIG. 1(D) illustrates the case where the resolution of the image data img2[1,1] to the image data img2[2,2] are upconverted to four times as high as the resolution of the image data a[1,1] to the image data a[2,2]. In other words, the case where each of the resolutions of the image data img2[1,1] to the image data img2[2,2] becomes 320×240 is shown.

Upconversion can be performed using a neural network, especially CNN. In the case where an upconversion is performed using a neural network, the upconversion can be done accurately with the neural network learning repeatedly. Thus, high-quality image data can be generated by the image receiving apparatus which is operated by the image processing method according to one embodiment of the present invention.

Figure 1E:
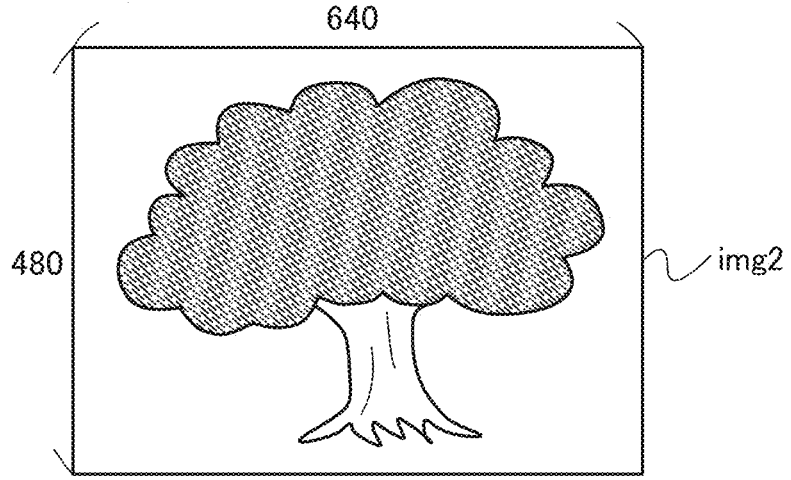

Then, the image data img2[1,1] to the image data img2[2,2] are combined. FIG. 1(E) illustrates image data img2 which is the image data that has been combined. As illustrated in FIG. 1(E), the resolution of the image data img2 is 640×480. By the above-described method, image data with a resolution of 320×240 is upconverted to image data with a resolution of 640×480.

As described above, in the image processing method of one embodiment of the present invention, the image data received by the image receiving apparatus is divided and then upconverted. Thus, even when the volume of image data received by the image receiving apparatus is increased, the amount of computation needed when upconverting the image data can be prevented from increasing significantly.

In an image processing method of one embodiment of the present invention, the divided image data before upconversion such as the image data img1[1,1] to the image data img1[2,2] each include a part of adjacent image data. Thus, the displacement of the image data at each connection portion (boundary) when the image data which have been upconverted are combined can be suppressed as compared to the case where the divided image data are not supplemented with the adjacent image data, and edge padding or zero padding is performed, for example. When an image corresponding to the image data which have been upconverted is displayed, each connection portion can be made less visible. Therefore, by the image processing method of one embodiment of the present invention, high-quality image data can be generated.

In FIGS. 1(A), 1(B), 1(C), 1(D) and 1(E), the resolution of the image data img1 is 320×240 and the resolution of the image data img2 is 640×480; but the image processing method of one embodiment of the present invention is not limited thereto. The image data img1 can be set to an arbitrary resolution. The resolution of the image data img2 is higher than the resolution of the image data img1. For example, the resolution may be greater than or equal to 2×2 times, 3×3 times, 4×4 times, or 5×5 times.

In FIGS. 1(B) and 1(C), the image data img1 is divided into 2×2; however, one embodiment of the present invention is not limited thereto. For example, the image data img1 may be divided into 3×3, may be divided into 4×4, may be divided into 10×10, or may be divided into image data more than 10×10. Also, the number of divisions in the horizontal direction and the number of divisions in the vertical direction may be different from one another. For example, the image data img1 may be divided into 4×3, meaning dividing into 4 in the horizontal direction and 3 in the vertical direction. In this case, the image data img1 is divided into image data img1[1,1] to image data img1[4,3].

Note that the neural network included in an image receiving apparatus operated by an image processing method of one embodiment of the present invention can obtain the function of upconverting image data by, for example, supervised learning.

Next, as an example of learning methods of a neural network included in the image receiving apparatus operated by the image processing method of one embodiment of the present invention, a learning method for obtaining the function of upconverting the image data img1 which has been divided into 2×2 to the image data img2 is described. First, an image corresponding to the image data img2, i.e., an image with the same resolution as the image data img2, is prepared. Next, the image data is divided and image data corresponding to the image data img2[1,1] to the image data img2[2,2] is generated. Then, the resolution of the image data corresponding to the image data img2[1,1] to the image data img2[2,2] is lowered, and by supplementing the image data with a method similar to that illustrated in FIG. 1(C) and the like, image data corresponding to the image data img1[1,1] to the image data img1[2,2] is generated. For example, in the case where the resolution of the image data corresponding to the image data img2[1,1] to the image data img2[2,2] is 320×240, after the resolution of the image data is lowered to 160×120, by supplementing the adjacent image data, the image data corresponding to the image data img1[1,1] to the image data img1[2,2] is generated.

Then, learning is performed using the image data corresponding to the image data img1[1,1] to the image data img1[2,2] as input data, and using the image data corresponding to the image data img2[1,1] to the image data img2[2,2] as teacher data, and learning is performed. For example, a weight coefficient of a neural network is updated so that image data inferred from the image data img1[1,1] matches with the image data img2[1,1]. The above is one example of learning methods.

Next, structural examples of the image data img1 and the image data img2 in the case of upconverting the image data img1 to the image data img2 using CNN is described in detail.

Figure 2A:
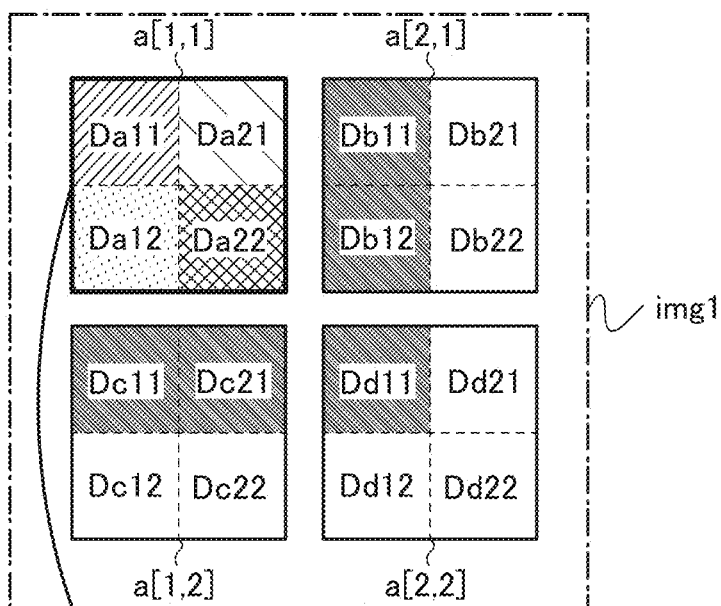
FIG. 2 Diagrams illustrating an example of an image processing method.

FIG. 2(A) illustrates the case in which the image data img1 includes the image data a[1,1], the image data a[2,1], the image data a[1,2], and the image data a[2,2], as in the case illustrated in FIG. 1(B). In the case illustrated in FIG. 2(A), the image data a[1,1] includes pixel data Da11, pixel data Da21, pixel data Da12, and pixel data Da22. The image data a[2,1] includes pixel data Db11, pixel data Db21, pixel data Db12, and pixel data Db22. The image data a[1,2] includes pixel data Dc11, pixel data Dc21, pixel data Dc12, and pixel data Dc22. The image data a[2,2] includes pixel data Dd11, pixel data Dd21, pixel data Dd12, and pixel data Dd22. That is, in the case illustrated in FIG. 2(A), the image data a[1,1] to the image data a[2,2] each include pixel data of 2×2. Note that each image data a may include each pixel data of 3×3 or more. As described above, the image data img1 may include image data a of 3×3 or more.

In this specification and the like, pixel data means, for example, data corresponding to a gray scale expressed by a pixel. One pixel data can be data corresponding to a gray scale expressed by one pixel, for example. For example, as in the case illustrated in FIG. 1(B), when the resolution of the image data a[1,1] is 160×120, the image data a[1,1] can have pixel data of 160×120.

Figure 2B:
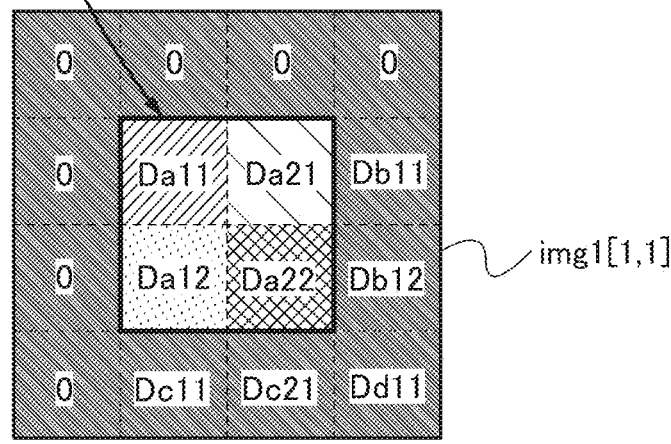

FIG. 2(B) illustrates a structural example of the image data img1[1,1] generated based on the image data a[1,1] illustrated in FIG. 2(A). In the case illustrated in FIG. 2(B), the surroundings of the image data a[1,1] are supplemented with pixel data adjacent to the image data a[1,1] which are the pixel data Db11, the pixel data Db12, the pixel data Dc11, the pixel data Dc21, and the pixel data Dd11. Moreover, the image data a does not exist above and on the left of the image data a[1,1], and thus data of "0" is supplemented.

Note that in the case illustrated in FIG. 2(B), although image data a[1,1] is supplemented with one row of pixel data below and is supplemented with one column of pixel data on the right, supplementation with two rows or more and two columns or more of pixel data can be performed. For example, in the case where two rows and two columns of pixel data is supplemented, besides the pixel data Db11, the pixel data Db12, the pixel data Dc11, the pixel data Dc21, and the pixel data Dd11, the pixel data Db21, the pixel data Db22, the pixel data Dc12, the pixel data Dc22, the pixel data Dd21, the pixel data Dd12, and the pixel data Dd22 are supplemented to the image data a[1,1].

In the case illustrated in FIG. 2(B), although the image data a[1,1] is supplemented with one column of data "0" on the left and one row of data "0" above, the image data a[1,1] can be supplemented with two rows or more of data "0" on the left and two columns or more of data "0" above, for example. Furthermore, instead of data "0", specific data other than "0" may be supplemented, or any of the pixel data included in the image data a[1,1] (the pixel data Da11, the pixel data Da21, the pixel data Da12, or the pixel data Da22) may be supplemented. It is not necessary to supplement the left and above of the image data img1 with data "0".

Figure 2C:
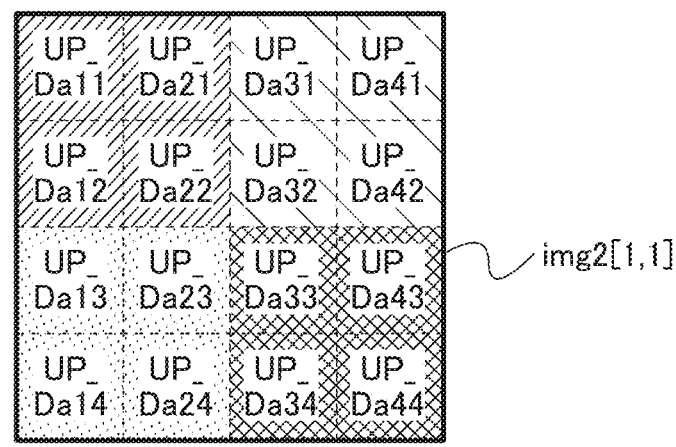

FIG. 2(C) illustrates a structural example of the image data img2[1,1] generated based on the image data img1[1,1] illustrated in FIG. 2(B). In the case illustrated in FIG. 2(C), the image data img2[1,1] includes 4×4 pixel data. Specifically, image data UP_Da11, pixel data UP_Da21, pixel data UP_Da31, pixel data UP_Da41, pixel data UP_Da12, pixel data UP_Da22, pixel data UP_Da32, pixel data UP_Da42, pixel data UP_Da13, pixel data UP_Da23, pixel data UP_Da33, pixel data UP_Da43, pixel data UP_Da14, pixel data UP_Da24, pixel data UP_Da34, and pixel data UP_Da44 are included.

Here, as indicated by hatching in FIGS. 2(B) and 2(C), the pixel data UP_Da11, the pixel data UP_Da21, the pixel data UP_Da12, and the pixel data UP_Da22 can be said to be generated on the basis of the pixel data Da11. The pixel data UP_Da31, the pixel data UP_Da41, the pixel data UP_Da32, and the pixel data UP_Da42 can be said to be generated on the basis of the pixel data Da21. The pixel data UP_Da13, the pixel data UP_Da23, the pixel data UP_Da14, and the pixel data UP_Da24 can be said to be generated on the basis of the pixel data Da12. The pixel data UP_Da33, the pixel data UP_Da43, the pixel data UP_Da34, and the pixel data UP_Da44 can be said to be generated on the basis of the pixel data Da22.

The image data a[1,1] including 2×2 pixel data is upconverted to the image data img2[1,1] including 4×4 pixel data. In other words, by upconverting the image data a[1,1] having the structure illustrated in FIG. 2(A) to 4 times the resolution, the image data img2[1,1] having the structure illustrated in FIG. 2(C) is generated.

By performing the operation illustrated in FIGS. 2(B) and 2(C) on all the image data a, the image data img1 is upconverted to the image data img2 which has 4 times the resolution.

<Convolutional Neural Network>

Figure 3:
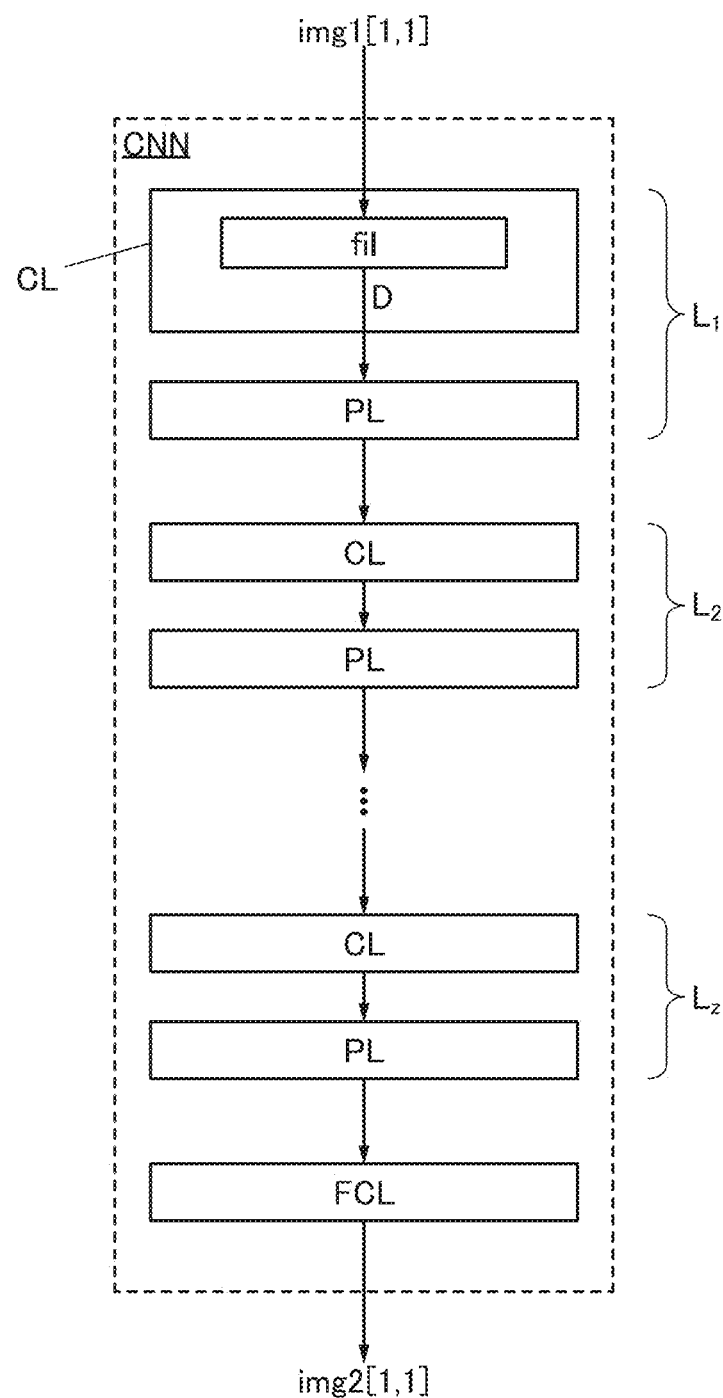
FIG. 3 A block diagram illustrating a structural example of CNN.

Next, CNN used in the image processing method of one embodiment of the present invention is described. FIG. 3 is a diagram illustrating a structural example of CNN. In CNN, the image data img1 which has been divided is input, and feature extraction is performed, whereby the image data img2 obtained by upconversion of the image data img1 is output. FIG. 3 illustrates the case where the image data img1[1,1] is input and the image data img2[1,1] is output.

A convolution layer CL has a function of performing convolution on image data. The convolution is performed by repetition of the product-sum operation of part of the image data and the filter value of a weight filter. By the convolution in the convolution layer CL, a feature of an image is extracted.

In the convolution, a weight filter can be used. An image data input to the convolution layer CL is subjected to filter processing using a filter fil, so that a data D is generated.

The data D subjected to the convolution is converted using an activation function, and then output to a pooling layer PL. As the activation function, ReLU (Rectified Linear Units) or the like can be used. ReLU is a function that outputs "0" when an input value is negative and outputs the input value as it is when the input value is greater than or equal to "0". As the activation function, a sigmoid function, a tanh function, or the like may be used as well.

The pooling layer PL has a function of performing pooling on the image data input from the convolution layer CL. Pooling is processing in which the image data is partitioned into a plurality of regions, and predetermined data is extracted from each of the regions and arranged in a matrix.

By the pooling, the image data is shrunk while the features extracted by the convolution layer CL remains. As the pooling, max pooling, average pooling, Lp pooling, or the like can be used.

In the CNN, feature extraction is performed using the above-described convolution processing and pooling processing. Note that the CNN can be composed of a plurality of convolution layers CL and a plurality of pooling layers PL. FIG. 3 illustrates a structure in which z layers (here, z is an integer greater than or equal to 1) of layers L which each include the convolution layer CL and the pooling layer PL are provided ($L_1$ to $L_z$) and the convolution processing and the pooling processing are performed z times. In this case, feature extraction can be performed on each layer L, which enables more advanced feature extraction.

A fully connected layer FCL has a function of determining an image using the image data subjected to convolution and pooling. The fully connected layer FCL has a structure in which all the nodes in one layer are connected to all the nodes in the next layer. The image data output from the convolution layer CL or the pooling layer PL is a two-dimensional feature map and is unfolded into a one-dimensional feature map when input to the fully connected layer FCL. Then, image data obtained as a result of the inference by the fully connected layer FCL is output.

Note that the structure of the CNN is not limited to the structure in FIG. 3. For example, each pooling layer PL may be provided for a plurality of convolution layers CL. Moreover, in the case where the positional information of the extracted feature is desired to be retained as much as possible, the pooling layer PL may be omitted.

Furthermore, in the case of classifying images using the output data from the fully connected layer FCL, an output layer electrically connected to the fully connected layer FCL may be provided. The output layer can output a classification class using a softmax function or the like as a likelihood function.

In addition, the CNN can perform supervised learning using image data as learning data and teacher data. In the supervised learning, a backpropagation method can be used, for example. Learning in the CNN enables optimization of the filter value of the weight filter, the weight coefficient of the fully connected layer, or the like.

This embodiment can be combined with the other embodiments described in this specification and the like as appropriate.

Embodiment 2

In this embodiment, an image receiving apparatus operated by the image processing method described in Embodiment 1 will be described. Note that a television device is described as an example of the image receiving apparatus in this embodiment.

<Structural Example of Image Receiving Apparatus>

Figure 4A:
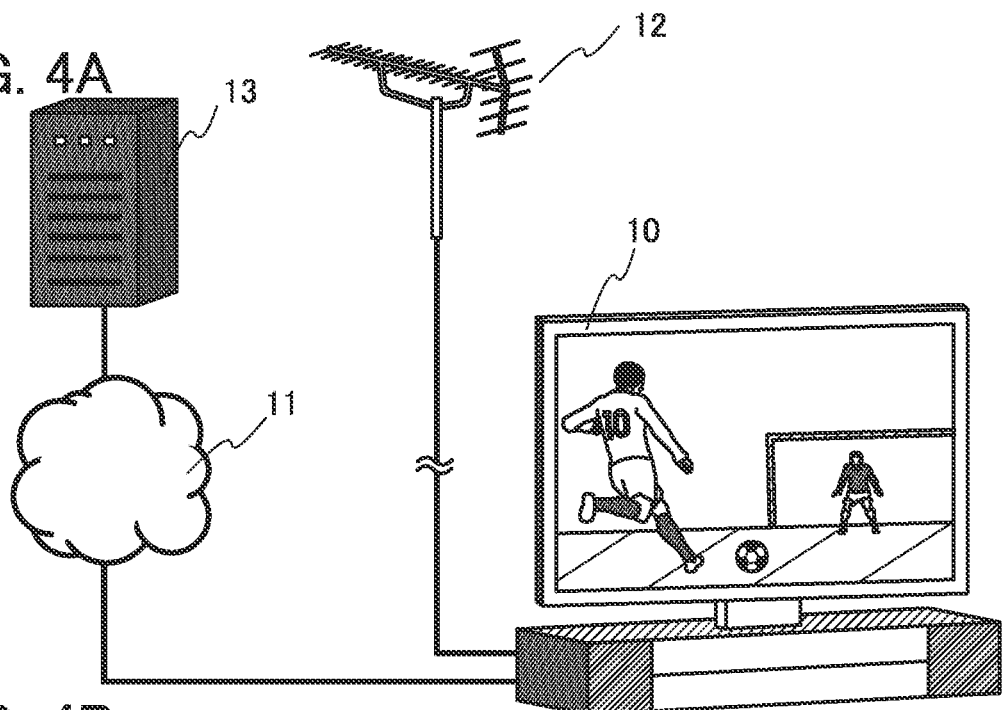
FIG. 4 An external view and a block diagram illustrating a structural example of a television device.

FIG. 4(A) is an external view of an image receiving apparatus 10. The image receiving apparatus 10 has a function of generating image data from a broadcast signal received by an antenna 12 and displaying an image. The image receiving apparatus 10 illustrated in FIG. 4(A) displays a soccer match broadcast as an example.

Furthermore, the image receiving apparatus 10 can communicate with a server 13 via a computer network 11.

Examples of airwaves that can be received by the antenna 12 includes a ground wave, and a wave transmitted from a satellite. In addition, examples of airwaves that can be received by the antenna 12 include airwaves for analog broadcasting, digital broadcasting, image-and-sound broadcasting, and audio-only broadcasting. For example, airwaves transmitted in a specific frequency band within an UHF band or a VHF band can be received. Furthermore, for example, by using a plurality of data received in a plurality of frequency bands, the transfer rate can be increased and more information can be obtained. Accordingly, a video with a resolution exceeding full high definition (pixel count of 1920×1080) can be displayed on a display panel 30. For example, an image with a resolution of 4K2K (pixel count of 3840×2160), 8K4K (pixel count of 7680×4320), 16K8K or higher can be displayed.

Accordingly, as the computer network 11, infrastructure of the World Wide Web (WWW) such as the Internet, an intranet, an extranet, a PAN (Personal Area Network), a LAN (Local Area Network), a CAN (Campus Area Network), a MAN (Metropolitan Area Network), a WAN (Wide Area Network), a GAN (Global Area Network) or the like can be given.

Figure 4B:
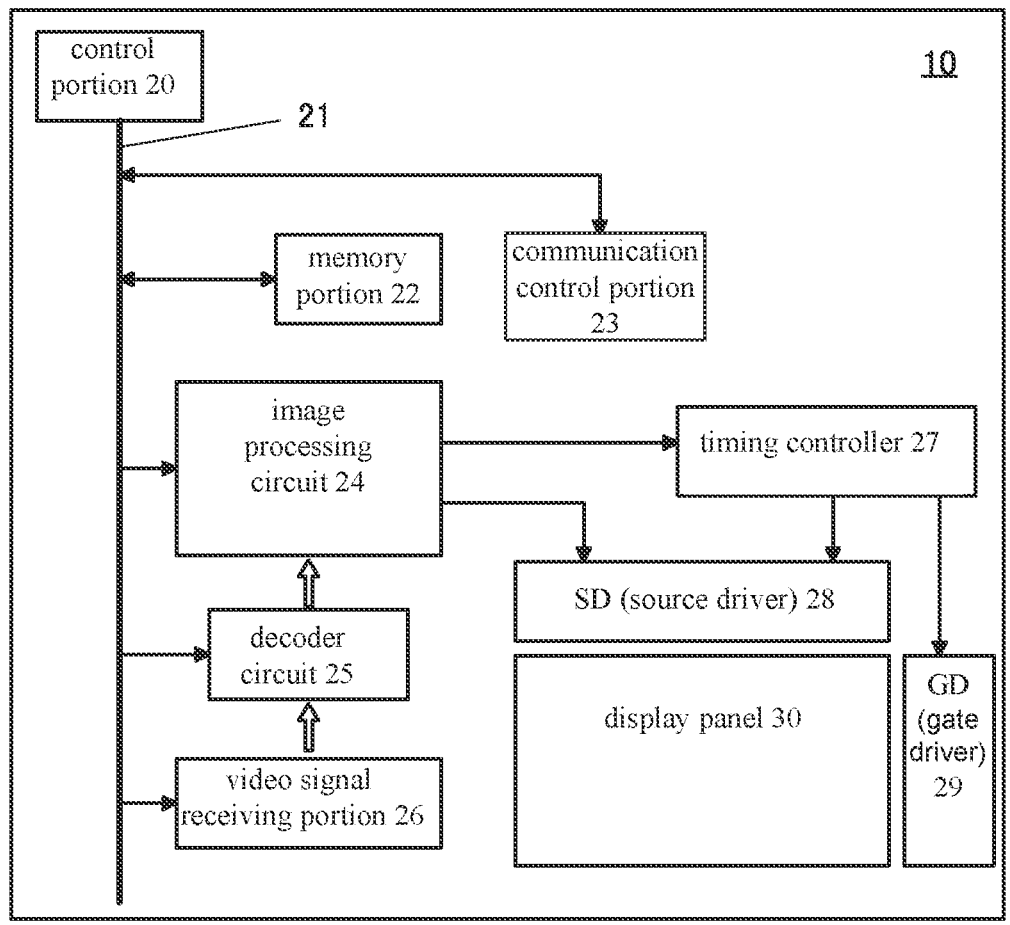

FIG. 4(B) is a block diagram illustrating a structural example of the image receiving apparatus 10. The image receiving apparatus 10 includes a control portion 20, a memory portion 22, a communication control portion 23, an image processing circuit 24, a decoder circuit 25, a video signal receiving portion 26, a timing controller 27, a SD (source driver) 28, a GD (gate driver) 29, the display panel 30, and the like. The SD 28 and the GD 29 are referred to as driver circuits of the display panel 30.

A transistor included in the driver circuit of the display panel 30 and a transistor forming pixels of the display panel 30 can be formed at the same time.

Part of or the whole of the driver circuit portion may be formed over another substrate and may be electrically connected to the display panel 30. For example, part of or the whole of the driver circuit portion may be formed with an IC chip using single crystal substrate and may be electrically connected to the display panel 30. The aforementioned IC chip can be mounted on the display panel 30 by a COG (Chip on glass) method or a COF (Chip on Film) method, for example.

The control portion 20 can function as a CPU, for example. For example, the control portion 20 has a function of controlling components such as the memory portion 22, the communication control portion 23, the image processing circuit 24, the decoder circuit 25, and the video signal receiving portion 26 via a system bus 21.

Signals are transmitted between the control portion 20 and each of the components via the system bus 21. In addition, the control portion 20 has a function of processing signals input from each of the components connected via the system bus 21, a function of generating signals to be output to each of the components, and the like, so that each of the components connected to the system bus 21 can be controlled collectively.

The memory portion 22 functions as a register, a cache memory, a main memory, a secondary memory, or the like that can be accessed by the control portion 20 and the image processing circuit 24.

As a memory device that can be used as a secondary memory, a memory device that uses a rewritable nonvolatile memory element can be used, for example. For example, a flash memory, a ReRAM (Resistive Random Access Memory), a MRAM (Magnetoresistive Random Access Memory), a PRAM (Phase change RAM), a FeRAM (Ferroelectric RAM), a NOSRAM, or the like can be used.

Note that a NOSRAM (registered trademark) is an abbreviation of "Nonvolatile Oxide Semiconductor RAM", which refers to a RAM including a gain-cell type (2T-type or 3T-type) memory cell. NOSRAM is a kind of OS memory that uses the low off-state current of an OS transistor. NOSRAM does not have a limit on the number of rewriting times unlike a flash memory, and the power consumption when writing data is low. Thus, a nonvolatile memory with high reliability and low power consumption can be provided.

In addition, as a memory device that can be used as a temporary memory such as a register, a cache memory, or a main memory, a volatile memory element such as a DRAM (Dynamic RAM), SRAM (Static Random Access Memory), or a DOSRAM may be used.

A DOSRAM (registered trademark) is an abbreviation of "Dynamic Oxide Semiconductor RAM", which refers to a RAM including a 1T (transistor) 1C (capacitor) type memory cell. DOSRAM is a kind of OS transistor that uses the low off-state current of an OS transistor. DOSRAM has a lower number of data refresh than DRAM. Moreover, as a memory cell can be formed over a peripheral circuit, the area occupied can be reduced. Thus, a highly integrated volatile memory with low power consumption can be provided.

As a RAM provided in the main memory, a DRAM is used, for example, in which case a memory space as a workspace for the control portion 20 is virtually allocated and used. An operating system, an application program, a program module, program data, and the like which are stored in the memory portion 22 are loaded into the RAM for execution. The data, program, and program module which are loaded into the RAM are directly accessed and operated by the control portion 20.

In the ROM, a BIOS (Basic Input/Output System), firmware, and the like for which rewriting is not needed can be stored. As the ROM, a mask ROM, an OTPROM (One Time Programmable Read Only Memory), an EPROM (Erasable Programmable Read Only Memory), or the like can be used. As the EPROM, a UV-EPROM (Ultra-Violet Erasable Programmable Read Only Memory) which can erase data by ultraviolet irradiation, an EEPROM (Electrically Erasable Programmable Read Only Memory), a flash memory, and the like, can be given.

Moreover, a structure in which, besides the memory portion 22, a detachable memory device is connectable may be employed. For example, it is preferable to include a terminal connected to a storage media drive functioning as a storage device such as a hard disk drive (HDD) or a solid state drive (SSD) or a storage medium such as a flash memory, a Blu-ray Disc, or a DVD. Accordingly, a video can be stored.

The communication control portion 23 has a function of controlling communication performed via the computer network 11. For example, a control signal for connection to the computer network 11 in response to instructions from the control portion 20 is controlled and the signal is transmitted to the computer network 11. Thus, connection to the computer network 11 is performed, so that communication with the server 13 can be performed.

Furthermore, the communication control portion 23 may have a function of communicating with the computer network 11 or other electronic devices using a communication standard such as Wi-Fi (registered trademark), Bluetooth (registered trademark), or ZigBee (registered trademark).

The video signal receiving portion 26 includes, for example, a demodulation circuit, an A-D converter circuit (analog-digital conversion circuit), and the like. The demodulation circuit has a function of demodulating a signal input from the antenna 12. Moreover, the A-D converter circuit has a function of converting the demodulated analog signal into a digital signal. The signal processed in the video signal receiving portion 26 is transmitted to the decoder circuit 25.

The decoder circuit 25 has a function of decoding video data included in a digital signal input from the video signal receiving portion 26 in accordance with the specifications of the broadcasting standard of the data to be transmitted, and a function of generating a signal transmitted to the image processing circuit. Examples of the broadcasting standard in 8K broadcasts include H.265|MPEG-H High Efficiency Video Coding (abbreviation: HEVC).

Alternatively, a structure in which the video signal receiving portion 26 and the decoder circuit 25 generate a signal transmitted to the image processing circuit 24 using the broadcasting data transmitted with data transmission technology through the computer network 11 may be employed. In the case where the received signal is a digital signal, the video signal receiving portion 26 does not necessarily include a demodulation circuit, an A-D converter circuit, and the like.

The image processing circuit 24 has a function of generating a video signal output to the timing controller 27 on the basis of a video signal input from the decoder circuit 25.

In addition, the timing controller 27 has a function of generating a signal (a signal such as a clock signal or a start pulse signal) output to the GD 29 and the SD 28 on the basis of a synchronization signal included in a video signal or the like on which the image processing circuit 24 performs processing. The timing controller 27 also has a function of outputting a video signal to the SD 28 in addition to the above signals.

The display panel 30 includes a plurality of pixels. Each pixel is driven by a signal supplied from the GD 29 and the SD 28. As the resolution of the display panel 30, a resolution corresponding to the standard such as full high definition, 4K2K, or 8K4K may be used.

A structure in which, for example, a processor is included can be employed for the control portion 20 or the image processing circuit 24 illustrated in FIG. 4(B). For example, a processor functioning as a CPU can be used for the control portion 20. In addition, other processors such as a DSP (Digital Signal Processor) or a GPU can be used for the image processing circuit 24, for example. Furthermore, a structure in which the above processor is obtained with a PLD (Programmable Logic Device) such as an FPGA (Field Programmable Gate Array) or an FPAA (Field Programmable Analog Array) may be employed for the control portion 20 or the image processing circuit 24.

The processor interprets and executes instructions from various programs to process various kinds of data and control programs. The programs that might be executed by the processor may be stored in a memory region included in the processor or a memory device which is additionally provided.

Furthermore, two or more functions among the functions of the control portion 20, the memory portion 22, the communication control portion 23, the image processing circuit 24, the decoder circuit 25, the video signal receiving portion 26, and the timing controller 27 may be aggregated in one IC chip to form a system LSI. For example, a system LSI including a processor, a decoder circuit, a tuner circuit, an A-D converter circuit, a DRAM, an SRAM, and the like may be employed.

Note that an OS transistor can also be used in an IC or the like included in the control portion 20 or another component. Since the OS transistor has an extremely low off-state current, the OS transistor is used as a switch for retaining electric charge (data) flowing into a capacitor functioning as a memory element, whereby a long data retention period can be ensured. Utilizing this characteristic for a register or a cache memory of the control portion 20 or the like enables normally-off computing where the control portion 20 operates only when needed and data on the previous processing is stored in the memory element in the other case. Thus, power consumption of the image receiving apparatus 10 can be reduced.

The image receiving apparatus 10 may include an external interface, an audio output portion, a touch panel unit, a sensor unit, a camera unit, or the like besides the configuration illustrated in FIG. 4(B). Examples of the external interface include an external connection terminal such as a USB (Universal Serial Bus) terminal, a LAN (Local Area Network) connection terminal, a power reception terminal, an audio output terminal, an audio input terminal, a video output terminal, and a video input terminal; a transceiver for optical communication using infrared rays, visible light, ultraviolet rays, or the like; a physical button provided on a housing; and the like. In addition, examples of the audio input/output portions include a sound controller, a microphone, and a speaker.

The image processing circuit 24 is described in detail below.

The image processing circuit 24 preferably has a function of executing image processing on the basis of a video signal input from the decoder circuit 25.

Examples of the image processing include noise removal processing, grayscale conversion processing, tone correction processing, luminance correction processing, and the like.

Examples of the tone correction processing or the luminance correction processing include gamma correction, and the like.

As the noise removal processing, various noise such as mosquito noise which appears near the outline of characters and the like, block noise which appears in high-speed moving images, random noise causing flicker, and dot noise caused by upconversion of the resolution are removed, for example.

The grayscale conversion processing converts the grayscale of an image to a grayscale corresponding to output characteristics of the display panel 30. For example, in the case where the number of grayscale levels is increased, gradation values are interpolated and assigned to pixels of an image input with a small number of grayscale levels, so that processing for smoothing a histogram can be performed. In addition, a high-dynamic range (HDR) processing for widening the dynamic range is also included in the grayscale conversion processing.

The tone correction processing corrects the tone of an image. The luminance correction processing corrects the brightness (luminance contrast) of an image. For example, a type, luminance, color purity, and the like of a lighting placed in a space where the image receiving apparatus 10 is provided are detected, and luminance and tone of images displayed on the display panel 30 are corrected to be optimal in accordance with the detection. Alternatively, a function of comparing a displayed image to images of various scenes in an image list stored in advance, and then correcting luminance and tone of the displayed image to be suitable to the images of the closest scene can be included.

Furthermore, the image processing circuit 24 preferably has a function of executing processing such as pixel interpolation processing in accordance with upconversion of the resolution or frame interpolation processing in accordance with upconversion of the frame frequency.

The pixel interpolation processing interpolates data which does not actually exist when resolution is upconverted.

In the case where the frame frequency of the displayed video is increased, the frame interpolation processing generates an image for a frame that does not actually exist (an interpolation frame).

The image processing circuit 24 preferably includes a circuit that performs computations of the neural network (hereinafter referred to as an NN circuit). The NN circuit preferably performs the above pixel interpolation processing using the image processing method described in Embodiment 1. Accordingly, the image receiving apparatus 10 can receive a low-resolution video signal and display a high-resolution image.

Furthermore, data of a weight coefficient used in the neural network is stored in the memory portion 22 as a data table. The latest version of the data table including the weight coefficient can be downloaded from the server 13 through the computer network 11, for example. Alternatively, a structure in which the image processing circuit 24 has a learning function and enables the update of the data table including the weight coefficient may be employed.

<Structural Example 1 of Display Panel>

Figure 5:
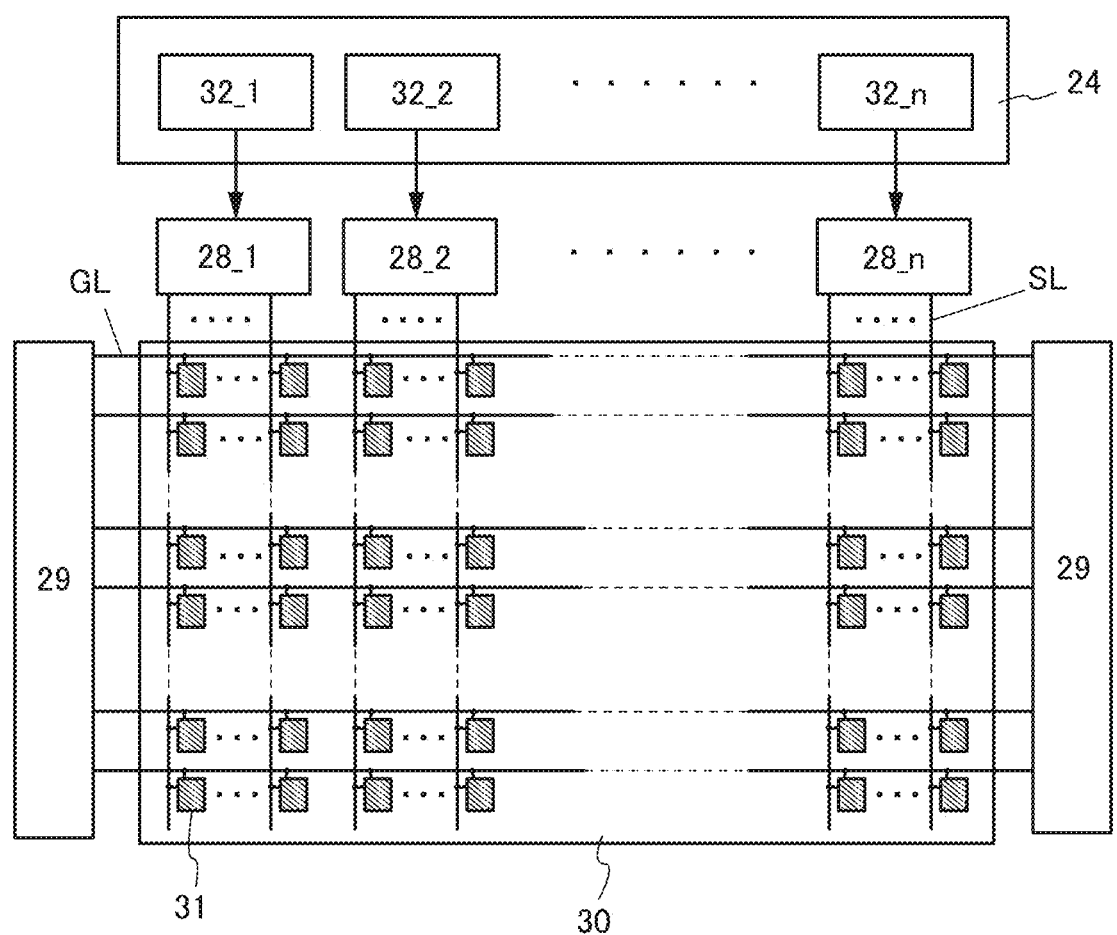
FIG. 5 A block diagram illustrating a structural example of a display panel.

FIG. 5 is a block diagram illustrating a structural example of the display panel 30 and its peripheral circuit. FIG. 5 illustrates the display panel 30, the GD 29, SDs 28_1 to 28_$n$ ($n$ is an integer greater than or equal to 2), and the image processing circuit 24. The display panel 30 includes a plurality of pixels 31 arranged in a matrix, and the image processing circuit 24 includes NN circuits 32_1 to 32_$n$. In FIG. 5, the GD 29 is provided on each of the left and right of the display panel 30.

The display panel 30 includes a plurality of scan lines GL that are arranged almost parallel to each other and whose potentials are controlled by the GD 29, and a plurality of signal lines SL that are arranged almost parallel to each other and whose potentials are controlled by the SDs 28_1 to 28_$n$.

Each of the scan lines GL is electrically connected to the plurality of pixels 31 provided in any of the rows among the pixels 31. Each of the signal lines SL is electrically connected to the plurality of pixels 31 provided in any of the columns among the pixels 31.

For the NN circuits 32_1 to 32_$n$, upconversion of image data can be performed by the image processing method described in Embodiment 1.

For example, in the case where the image data img1 is divided into 2×2 image data and upconversion is performed on each of the divided image data as illustrated in FIG. 1, n=2 is set in FIG. 5 and it is preferable that upconversion of the img1[1,1] be performed in the NN circuit 32_1, and upconversion of the img1[2,1] be performed in the NN circuit 32_2. Similarly, it is preferable that upconversion of the img1[1,2] be performed in the NN circuit 32_1, and upconversion of the img1[2,2] be performed in NN circuit 32_2. Each of the upconverted images is finally displayed on the display panel 30 in a combined state.

For example, in the case where the img1 is divided into 10×10 image data and upconversion is performed on each of the divided image data, n=10 is set in FIG. 5 and img1[1,1], [2,1], [3,1], [4,1], [5,1], [6,1], [7,1], [8,1], [9,1], [10,1] are preferably upconverted in the NN circuits 32_1, 32_2, 32_3, 32_4, 32_5, 32_6, 32_7, 32_8, 32_9, and 32_10, respectively.

In this manner, by providing the NN circuits in accordance with the number of divisions of the img1, the image receiving apparatus 10 can perform upconversion of the image data in parallel. That is, the image receiving apparatus 10 can display a video signal received from the antenna 12 on the display panel 30 with little time lag.

<Structural Example 2 of Display Panel>

Figure 6:
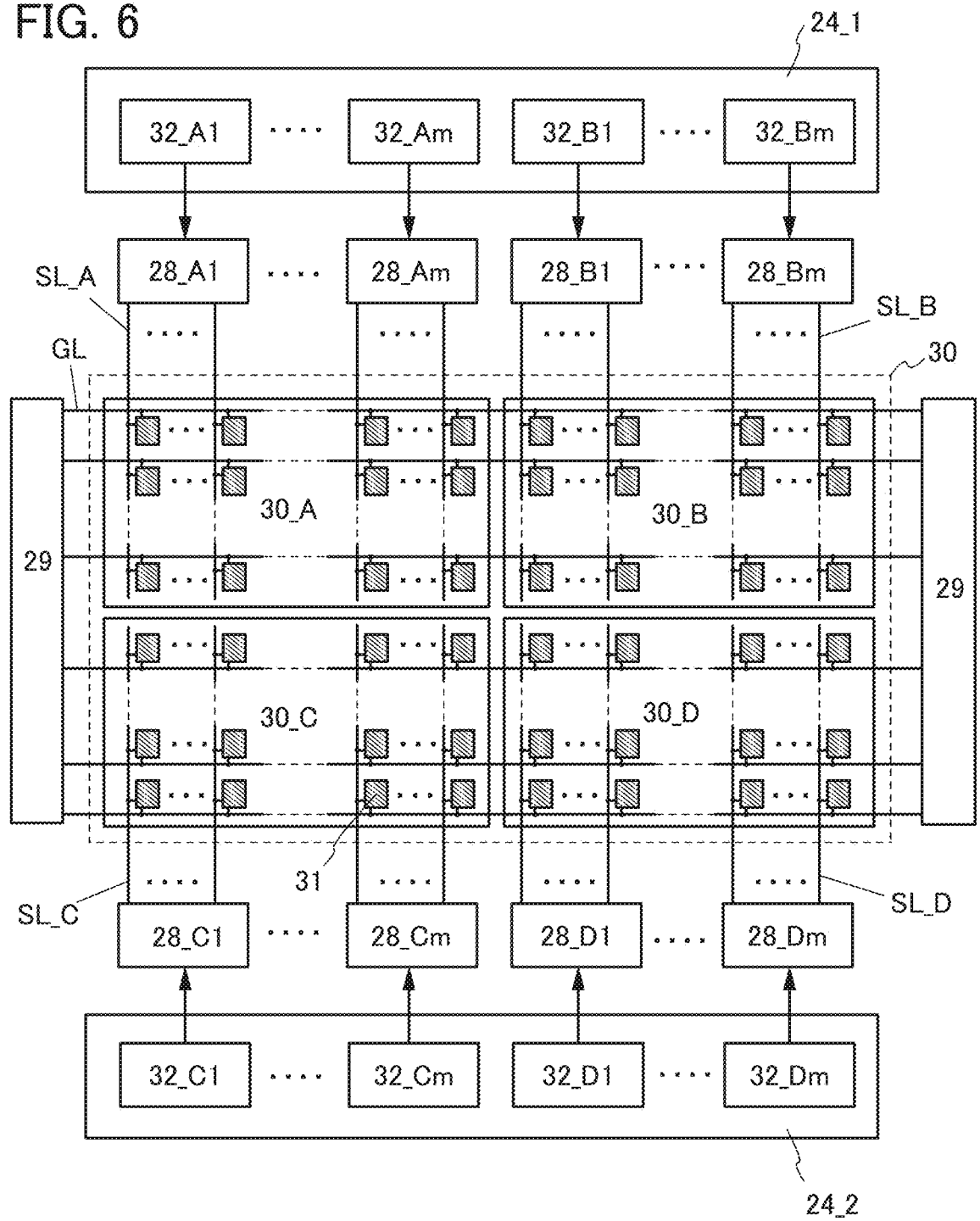
FIG. 6 A block diagram illustrating a structural example of a display panel.

FIG. 6 illustrates an example in which the display panel 30 in FIG. 5 is divided into four display panels 30_A, 30_B, 30_C, and 30_D. Note that the display panels 30_A to 30_D are collectively referred to as the display panel 30. Image data displayed on the display panel 30 is divided into four, and the four image data are displayed on the display panels 30_A to 30_D.

For the display panel 30_A, NN circuits 32_A1 to 32_Am (m is an integer greater than or equal to 2) perform upconversion of image data by the method described in Embodiment 1, and SDs 28_A1 to 28_Am supply image data to the display panel 30_A through a signal line SL_A.

For the display panel 30_B, NN circuits 32_B1 to 32_Bm perform upconversion of image data by the method described in Embodiment 1, and SDs 28_B1 to 28_Bm supply image data to the display panel 30_B through a signal line SL_B.

For the display panel 30_C, NN circuits 32_C1 to 32_Cm perform upconversion of image data by the method described in Embodiment 1, and SDs 28_C1 to 28_Cm supply image data to the display panel 30_C through a signal line SL_C.

For the display panel 30_D, NN circuits 32_D1 to 32_Dm perform upconversion of image data by the method described in Embodiment 1, and SDs 28_D1 to 28_Dm supply image data to the display panel 30_D through a signal line SL_D.

As in FIG. 5, image data displayed on the display panel 30_A is divided, and then upconverted. The NN circuits 32_A1 to 32_Am are preferably provided in accordance with the number of the above division. For example, when image data displayed on the display panel 30_A is divided into 10×10 and then upconverted, the NN circuits 32_A1 to 32_A10 (m=10) are preferably provided. The same applies to the display panels 30_B, 30_C, and 30_D.

The structure illustrated in FIG. 6 can reduce the number of the pixels 31 connected to one signal line. That is, the capacitance connected to one signal line can be reduced. Consequently, the time for writing image data to a signal line in a display panel can be shortened. The structure illustrated in FIG. 6 is preferably applied to a high-resolution display panel such as 8K in particular. For example, by applying a display panel with 4K pixels to each of the display panels 30_A to 30_D, the image receiving apparatus 10 can have a display panel with 8K pixels.

<Structural Example 3 of Display Panel>

Figure 7:
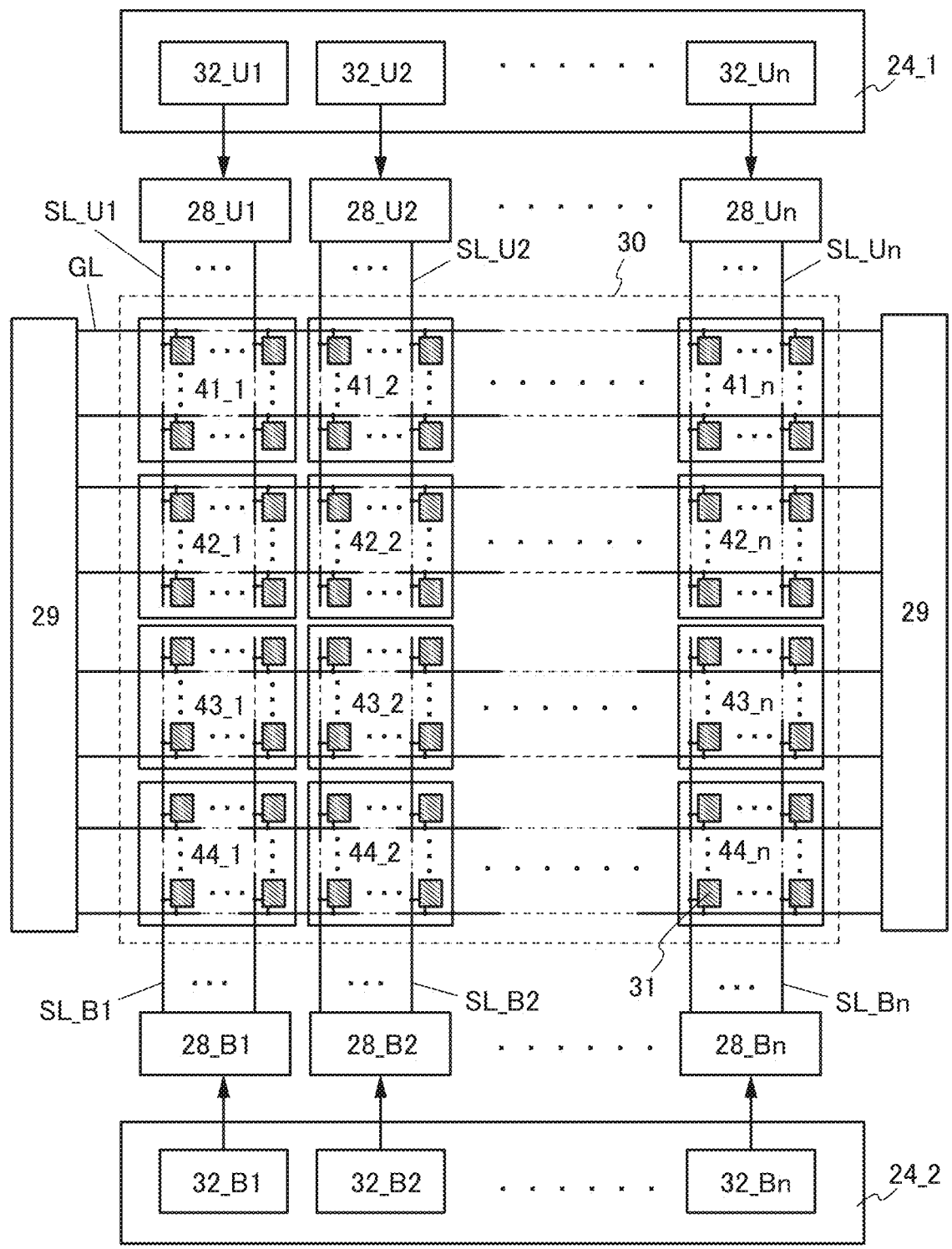
FIG. 7 A block diagram illustrating a structural example of a display panel.

FIG. 7 illustrates an example in which the display panel 30 in FIG. 5 is divided into display panels 41_1 to 41_n, display panels 42_1 to 42_n, display panels 43_1 to 43_n, and display panels 44_1 to 44_n. These divided display panels are collectively referred to as the display panel 30. Image data displayed on the display panel 30 is divided into 4×n, and the 4×n image data are displayed on the respective display panels. Note that the number of divisions of the display panel 30 is not limited to this and can be set freely.

For the display panels 41_1 and 42_1, an NN circuit 32_U1 performs upconversion of image data by the method described in Embodiment 1, and an SD 28_U1 supplies image data to the display panels 41_1 and 42_1 through a signal line SL_U1.

For the display panels 41_n and 42_n, an NN circuit 32_Un performs upconversion of image data by the method described in Embodiment 1, and an SD 28_Un supplies image data to the display panels 41_n and 42_n through a signal line SL_Un.

For the display panels 43_1 and 44_1, the NN circuit 32_B1 performs upconversion of image data by the method described in Embodiment 1, and the SD 28_B1 supplies image data to the display panels 43_1 and 44_1 through a signal line SL_B1.

For the display panels 43_n and 44_n, an NN circuit 32_Bn performs upconversion of image data by the method described in Embodiment 1, and an SD 28_Bn supplies image data to the display panels 43_n and 44_n through a signal line SL_Bn.

FIG. 7 differs from the structure in FIG. 6 in that one NN circuit and one source driver are connected to one display panel.

<Structural Example 4 of Display Panel>

Figure 8:
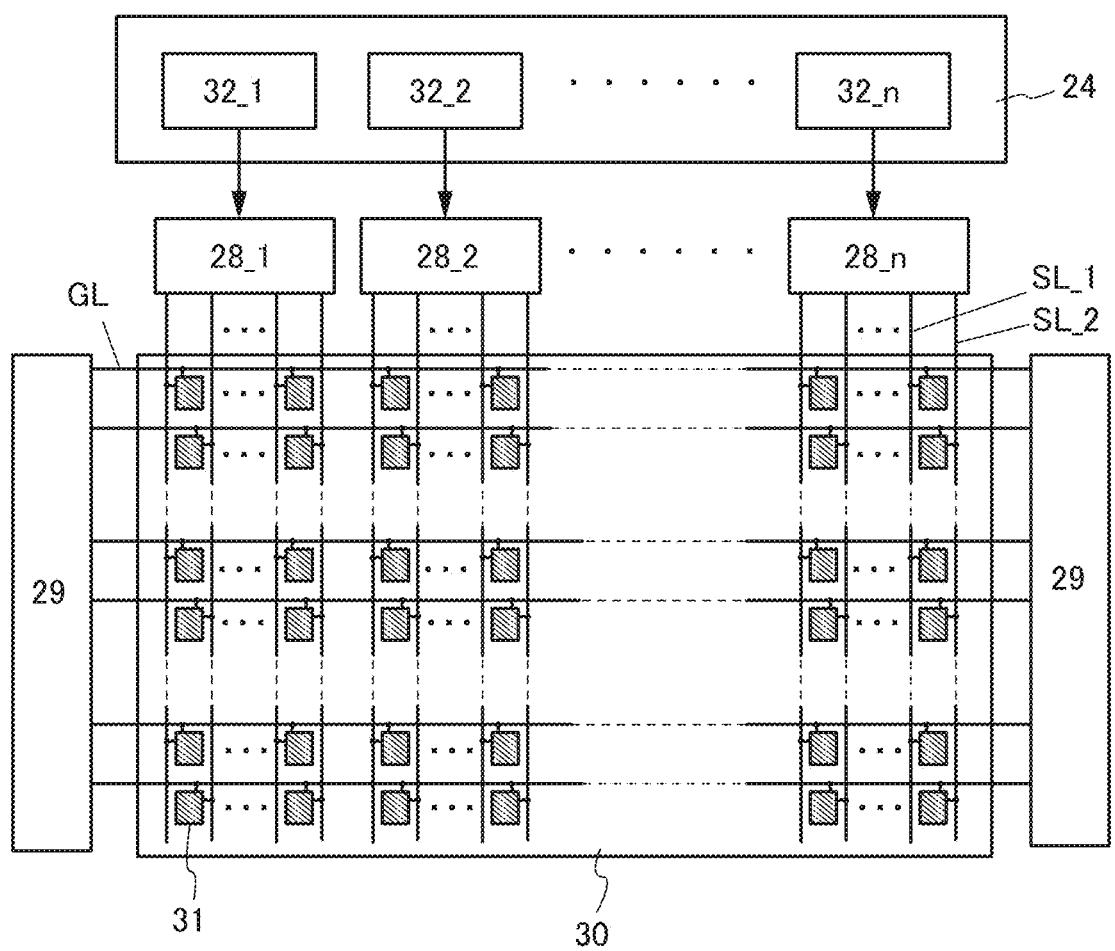
FIG. 8 A block diagram illustrating a structural example of a display panel.

FIG. 8 illustrates an example in which the signal line SL in FIG. 5 is divided into two signal lines SL1 and SL2. The plurality of pixels 31 arranged in the same column are electrically connected to the signal line SL1 and the signal line SL2 alternately.

The structure illustrated in FIG. 8 can reduce the number of the pixels 31 connected to one signal line. Consequently, in the display panel 30, the time for writing image data to the signal line can be shortened, and image data can be switched at high speed.

In the structures illustrated in FIG. 6 and FIG. 7, seams exist between display panels and the effects of the seams appear on the displayed image; however, in the structure illustrated in FIG. 8, seams do not exist and thus the above-mentioned issue can be avoided. Consequently, the display panel 30 can display a seamless and smooth image.

<Configuration Example of Pixel Circuit>

Next, circuit configurations that can be used for the above-described pixels 31 will be described using FIG. 9.

Figure 9A:
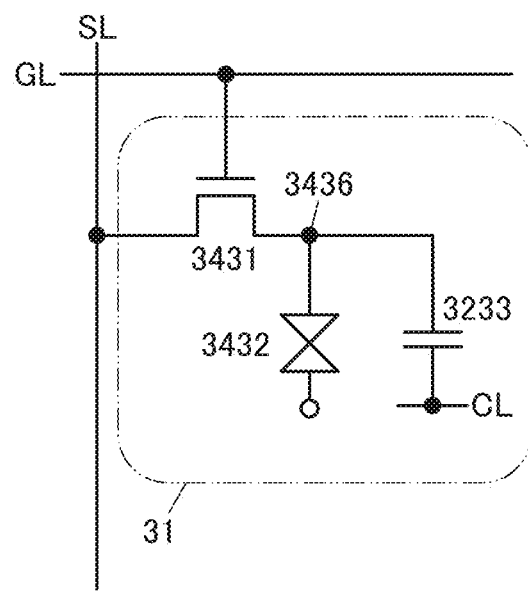
FIG. 9 Circuit diagrams illustrating configuration examples of a pixel.

The pixel 31 illustrated in FIG. 9(A) includes a transistor 3431, a capacitor 3233, and a liquid crystal element 3432.

One of a source and a drain of the transistor 3431 is electrically connected to the signal line SL, and the other is electrically connected to a node 3436. A gate of the transistor 3431 is electrically connected to the scan line GL. The transistor 3431 has a function of controlling the writing of a data signal to the node 3436.

One of a pair of electrodes of the capacitor 3233 is electrically connected to a wiring to which a particular potential is supplied (hereinafter, also referred to as a "capacitor line CL"), and the other is electrically connected to the node 3436. The potential of the capacitor line CL is set in accordance with the specifications of the pixel 31 as appropriate. The capacitor 3233 has a function of retaining data written to the node 3436.

One of a pair of electrodes of the liquid crystal element 3432 is supplied with a common potential, and the other is electrically connected to the node 3436. The alignment state of liquid crystals included in the liquid crystal element 3432 is determined by the potential written to the node 3436.

As a mode for the liquid crystal element 3432, for example, a TN mode, a STN mode, a VA mode, an ASM (Axially Symmetric Aligned Micro-cell) mode, an OCB (Optically Compensated Birefringence) mode, an FLC (Ferroelectric Liquid Crystal) mode, an AFLC (AntiFerroelectric Liquid Crystal) mode, an MVA mode, a PVA (Patterned Vertical Alignment) mode, an IPS mode, an FFS mode, a TBA (Transverse Bend Alignment) mode, or the like may be employed. Other examples include an ECB (Electrically Controlled Birefringence) mode, a PDLC (Polymer Dispersed Liquid Crystal) mode, a PNLC (Polymer Network Liquid Crystal) mode, a guest-host mode, and the like. However, the mode is not limited thereto, and a variety of modes can be used.

Figure 9B:
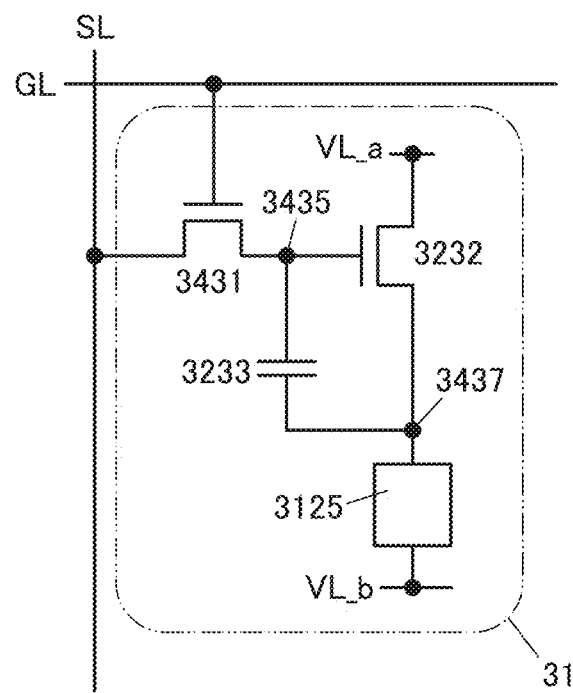

The pixel 31 illustrated in FIG. 9(B) includes the transistor 3431, the capacitor 3233, a transistor 3232, and a light-emitting element 3125.

One of the source and the drain of the transistor 3431 is electrically connected to the signal line SL to which a data signal is supplied, and the other is electrically connected to a node 3435. The gate of the transistor 3431 is electrically connected to the scan line GL to which a gate signal is supplied. The transistor 3431 has a function of controlling the writing of the data signal to the node 3435.

One of the pair of electrodes of the capacitor 3233 is electrically connected to the node 3435, and the other is electrically connected to a node 3437. The capacitor 3233 has a function of a storage capacitor for retaining data written to the node 3435.

One of a source and a drain of the transistor 3232 is electrically connected to a potential supply line VL_a, and the other is electrically connected to the node 3437. A gate of the transistor 3232 is electrically connected to the node 3435. The transistor 3232 has a function of controlling current flowing through the light-emitting element 3125.

One of an anode and a cathode of the light-emitting element 3125 is electrically connected to a potential supply line VL_b, and the other is electrically connected to the node 3437.

As the light-emitting element 3125, an organic electroluminescent element (also referred to as an organic EL element) or the like can be used, for example. However, the light-emitting element 3125 is not limited thereto, and an inorganic EL element formed of an inorganic material may be used, for example.

For example, the potential supply line VL_a has a function of supplying VDD. The potential supply line VL_b has a function of supplying Vss.

<Cross-Sectional View>

Next, the structural examples of the cross-section of the display panel 30 will be described with reference to FIG. 10 and FIG. 11.

The display panels 30 illustrated in FIGS. 10(A) and 10(B) each include an electrode 4015, and the electrode 4015 is electrically connected to a terminal included in an FPC 4018 through an anisotropic conductive layer 4019. The electrode 4015 is electrically connected to a wiring 4014 in an opening formed in an insulating layer 4112, an insulating layer 4111, and an insulating layer 4110. The electrode 4015 is formed using the same conductive layer as a first electrode layer 4030.

The pixel 31 provided over a first substrate 4001 includes a transistor; FIG. 10(A) exemplifies the transistor 3431 included in the pixel 31 and FIG. 10(B) exemplifies the transistor 3232 included in the pixel 31.

The transistors 3431 and 3232 are provided over an insulating layer 4102. The transistors 3431 and 3232 each include an electrode 517 formed over the insulating layer 4102, and an insulating layer 4103 is formed over the electrode 517. A semiconductor layer 512 is formed over the insulating layer 4103. An electrode 510 and an electrode 511 are formed over the semiconductor layer 512, the insulating layer 4110 and the insulating layer 4111 are formed over the electrode 510 and the electrode 511, and an electrode 516 is formed over the insulating layer 4110 and the insulating layer 4111. The electrode 510 and the electrode 511 are formed using the same conductive layer as the wiring 4014.

In the transistors 3431 and 3232, the electrode 517 has a function of a gate, the electrode 510 has a function of one of a source and a drain, the electrode 511 has a function of the other of the source and the drain, and the electrode 516 has a function of a back gate.

Since the transistors 3431 and 3232 each have a bottom gate structure and include a back gate, the on-state current of the transistors can be increased. Moreover, the threshold voltage of the transistors can be controlled. Note that the electrode 516 may be omitted in some cases to simplify the manufacturing process.

In the transistors 3431 and 3232, the semiconductor layer 512 has a function of a channel formation region. For the semiconductor layer 512, crystalline silicon, polycrystalline silicon, amorphous silicon, a metal oxide, an organic semiconductor, or the like is used. In addition, if necessary, impurities may be introduced to the semiconductor layer 512 to increase the conductivity of the semiconductor layer 512 or control the threshold voltage of the transistors.

In the case where a metal oxide is used for the semiconductor layer 512, the semiconductor layer 512 preferably contains indium (In). When a metal oxide containing indium is used for the semiconductor layer 512, the carrier mobility (electron mobility) of the semiconductor layer 512 becomes high. The semiconductor layer 512 is preferably an oxide semiconductor containing an element M. The element M is preferably aluminum (Al), gallium (Ga), tin (Sn), or the like. Other elements that can be used as the element M are boron (B), silicon (Si), titanium (Ti), iron (Fe), nickel (Ni), germanium (Ge), yttrium (Y), zirconium (Zr), molybdenum (Mo), lanthanum (La), cerium (Ce), neodymium (Nd), hafnium (Hf), tantalum (Ta), tungsten (W), and the like. Note that a plurality of the above-described elements may be used in combination as the element M in some cases. The element M is an element having high bonding energy with oxygen, for example. For example, the element M is an element whose bonding energy with oxygen is higher than that of indium. The semiconductor layer 512 is preferably a metal oxide containing zinc (Zn). The metal oxide containing zinc is easily crystallized in some cases.

The semiconductor layer 512 is not limited to the metal oxide containing indium. The semiconductor layer 512 may be a metal oxide that does not contain indium and contains zinc, a metal oxide that contains gallium, or a metal oxide that contains tin; for example, a zinc tin oxide or a gallium tin oxide.

The display panels 30 illustrated in FIGS. 10(A) and 10(B) each include the capacitor 3233. The capacitor 3233 has a region where the electrode 511 overlaps with an electrode 4021 with the insulating layer 4103 positioned therebetween. The electrode 4021 is formed using the same conductive layer as the electrode 517.

FIG. 10(A) illustrates an example of a liquid crystal display panel using a liquid crystal element as a display element. In FIG. 10(A), the liquid crystal element 3432 that is a display element includes the first electrode layer 4030, a second electrode layer 4031, and a liquid crystal layer 4008. An insulating layer 4032 and an insulating layer 4033 having a function of alignment films are provided so that the liquid crystal layer 4008 is positioned therebetween. The second electrode layer 4031 is provided on a second substrate 4006 side, and the first electrode layer 4030 and the second electrode layer 4031 overlap with each other with the liquid crystal layer 4008 positioned therebetween.

A spacer 4035 is a columnar spacer obtained by selective etching of an insulating layer and is provided to adjust a distance (a cell gap) between the first electrode layer 4030 and the second electrode layer 4031. Note that a spherical spacer can also be used.

In the case where a liquid crystal element is used as a display element, a thermotropic liquid crystal, a low-molecular liquid crystal, a high-molecular liquid crystal, a polymer-dispersed liquid crystal, a ferroelectric liquid crystal, an anti-ferroelectric liquid crystal, or the like can be used. These liquid crystal materials exhibit a cholesteric phase, a smectic phase, a cubic phase, a chiral nematic phase, an isotropic phase, or the like depending on conditions.

The specific resistance of a liquid crystal material is greater than or equal to $1 \times 10^9$ Ω·cm, preferably greater than or equal to $1 \times 10^{11}$ Ω·cm, more preferably greater than or equal to $1 \times 10^{12}$ Ω·cm. Note that a value of the specific resistivity in this specification is a value measured at 20° C.

In the case where an OS transistor is used as the transistor 3431, the transistor 3431 can have a low current value in an off state (off-state current). Accordingly, the retention time of an electrical signal such as a video signal can be made long, and a writing interval can be set long in an on state. Therefore, the frequency of refresh operations can be reduced, resulting in an effect of reducing power consumption.

In the display panel, a black matrix (a light-blocking layer), an optical member (an optical substrate) such as a polarizing member, a retardation member, or an anti-reflection member, and the like may be provided as appropriate. For example, circular polarization may be employed by using a polarizing substrate and a retardation substrate. In addition, a backlight, a side light, or the like may be used as a light source.

FIG. 10(B) illustrates an example of a display panel using a light-emitting element such as an EL element as a display element. EL elements are classified into organic EL elements and inorganic EL elements.

In an organic EL element, by voltage application, electrons and holes are injected from one electrode and the other electrode respectively to an EL layer. The carriers (electrons and holes) are recombined, a light-emitting organic compound forms an excited state, and light is emitted when the excited state returns to a ground state. Owing to such a mechanism, this organic EL element is referred to as a current-excitation light-emitting element. Besides the light-emitting compound, the EL layer may also include a substance with a high hole-injection property, a substance with a high hole-transport property, a hole-blocking material, a substance with a high electron-transport property, a substance with a high electron-injection property, a substance with a bipolar property (a substance with a high electron-transport property and a high hole-transport property), and the like. The EL layer can be formed by a method such as an evaporation method (including a vacuum evaporation method), a transfer method, a printing method, an inkjet method, or a coating method.

The inorganic EL elements are classified according to their element structures into a dispersion-type inorganic EL element and a thin-film inorganic EL element. A dispersion-type inorganic EL element has a light-emitting layer where particles of a light-emitting material are dispersed in a binder, and its light emission mechanism is donor-acceptor recombination type light emission that utilizes a donor level and an acceptor level. A thin-film inorganic EL element has a structure in which a light-emitting layer is interposed between dielectric layers, which are further interposed between electrodes, and its light emission mechanism is localized type light emission that utilizes inner-shell electron transition of metal ions.

FIG. 10(B) illustrates an example in which an organic EL element is used as the light-emitting element 3125.

In FIG. 10(B), the light-emitting element 3125 is electrically connected to the transistor 3232 provided in the pixel 31. The structure of the light-emitting element 3125 is a stacked-layer structure of the first electrode layer 4030, a light-emitting layer 4511, and the second electrode layer 4031; but the structure is not limited thereto. The structure of the light-emitting element 3125 can be changed as appropriate in accordance with the direction in which light is extracted from the light-emitting element 3125.

A partition wall 4510 is formed using an organic insulating material or an inorganic insulating material. It is particularly preferable that, using a photosensitive resin material, an opening portion be formed over the first electrode layer 4030 so that a side surface of the opening portion is formed to be an inclined surface having continuous curvature.

The light-emitting layer 4511 may be formed using a single layer or a plurality of layers stacked.

A protective layer may be formed over the second electrode layer 4031 and the partition wall 4510 in order to prevent entry of oxygen, hydrogen, moisture, carbon dioxide, and the like into the light-emitting element 3125. For the protective layer, silicon nitride, silicon nitride oxide, aluminum oxide, aluminum nitride, aluminum oxynitride, aluminum nitride oxide, DLC (Diamond Like Carbon), or the like can be formed. In a space that is sealed by the first substrate 4001, the second substrate 4006, and a sealant 4005, a filler 4514 is provided for sealing. In this manner, it is preferable that packaging (sealing) be performed with a protective film (such as a laminate film or an ultraviolet curable resin film) or a cover material with high air-tightness and little degasification to prevent exposure to outside air.

As the filler 4514, besides an inert gas such as nitrogen or argon, an ultraviolet curable resin or a thermosetting resin can be used; and PVC (polyvinyl chloride), an acrylic resin, polyimide, an epoxy resin, a silicone resin, PVB (polyvinyl butyral), EVA (ethylene vinyl acetate), or the like can be used. In addition, a drying agent may be contained in the filler 4514.

For the sealant 4005, a glass material such as a glass frit or a curable resin that is cured at room temperature such as a two-component-mixture-type resin, a light curable resin, or a thermosetting resin can be used. In addition, a drying agent may be contained in the sealant 4005.

In addition, if necessary, an optical film such as a polarizing plate, a circularly polarizing plate (including an elliptically polarizing plate), a retardation plate (λ/4 plate or λ/2 wave plate), or a color filter may be provided as appropriate on a light-emitting surface of the light-emitting element. Furthermore, the polarizing plate or the circularly polarizing plate may be provided with an anti-reflection film. For example, anti-glare treatment that can reduce glare by diffusing reflected light with projections and depressions on a surface can be performed.

When the light-emitting element has a microcavity structure, light with high color purity can be extracted. Furthermore, when a microcavity structure and a color filter are used in combination, glare can be reduced and visibility of a displayed image can be increased.

For the first electrode layer 4030 and the second electrode layer 4031, a light-transmitting conductive material such as an indium oxide containing tungsten oxide, an indium zinc oxide containing tungsten oxide, an indium oxide containing titanium oxide, an indium tin oxide, an indium tin oxide containing titanium oxide, an indium zinc oxide, or an indium tin oxide to which silicon oxide is added can be used.

The first electrode layer 4030 and the second electrode layer 4031 can be formed using one or more kinds of metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); alloys thereof; and metal nitrides thereof.

The first electrode layer 4030 and the second electrode layer 4031 can be formed using a conductive composition including a conductive high molecule (also referred to as a conductive polymer). As the conductive high molecule, a so-called 7c-electron conjugated conductive high molecule can be used. For example, polyaniline or a derivative thereof, polypyrrole or a derivative thereof, polythiophene or a derivative thereof, a copolymer of two or more kinds of aniline, pyrrole, and thiophene or a derivative thereof, and the like can be given.

In order to extract light from the light-emitting element 3125 to the outside, at least one of the first electrode layer 4030 and the second electrode layer 4031 is transparent. In accordance with the method to extract light, the structures of the display panels are classified into a top emission structure, a bottom emission structure, and a dual emission structure. In the top emission structure, light is extracted through the substrate 4006. In the bottom emission structure, light is extracted through the substrate 4001. In the dual emission structure, light is extracted through both the substrate 4006 and the substrate 4001. For example, in the case of the top emission structure, the second electrode layer 4031 is transparent. For example, in the case of the bottom emission structure, the first electrode layer 4030 is transparent. For example, in the case of the dual emission structure, the first electrode layer 4030 and the second electrode layer 4031 are transparent.

(Substrate 4001)

A material having heat resistance high enough to withstand heat treatment in the manufacturing process can be used for the substrate 4001 or the like. For example, a material with a thickness less than or equal to 0.7 mm and greater than or equal to 0.1 mm can be used for the substrate 4001. Specifically, a material polished to a thickness of approximately 0.1 mm can be used.

For example, a glass substrate with a large area of the 6th generation (1500 mm×1850 mm), the 7th generation (1870 mm×2200 mm), the 8th generation (2200 mm×2400 mm), the 9th generation (2400 mm×2800 mm), the 10th generation (2950 mm×3400 mm), or the like can be used as the substrate 4001 or the like. Thus, a large-sized display device can be manufactured.

An organic material, an inorganic material, a composite material of an organic material and an inorganic material, or the like can be used for the substrate 4001 or the like. For example, an inorganic material such as glass, ceramic, or a metal can be used for the substrate 4001 or the like.

Specifically, non-alkali glass, soda-lime glass, potash glass, crystal glass, aluminosilicate glass, tempered glass, chemically tempered glass, quartz, sapphire, or the like can be used for the substrate 4001 or the like. Specifically, an inorganic oxide film, an inorganic nitride film, an inorganic oxynitride film, or the like can be used for the substrate 4001 or the like. For example, a silicon oxide film, a silicon nitride film, a silicon oxynitride film, an aluminum oxide film, or the like can be used for the substrate 4001 or the like. Stainless steel, aluminum, or the like can be used for the substrate 4001 or the like.

For example, a single crystal semiconductor substrate made of silicon or silicon carbide, a polycrystalline semiconductor substrate, a compound semiconductor substrate of silicon germanium or the like, an SOI substrate, or the like can be used as the substrate 4001 or the like. Thus, a semiconductor element can be formed on the substrate 4001 or the like.

For example, an organic material such as a resin, a resin film, or a plastic can be used for the substrate 4001 or the like. Specifically, a resin film or a resin plate of polyester, polyolefin, polyamide, polyimide, polycarbonate, an acrylic resin, or the like can be used for the substrate 4001 or the like.

For example, a composite material in which a metal plate, a thin glass plate, or a film of an inorganic material or the like is attached to a resin film or the like can be used for the substrate 4001 or the like. For example, a composite material in which a fibrous or particulate metal, glass, an inorganic material, or the like is dispersed into a resin film can be used for the substrate 4001 or the like. For example, a composite material in which fibrous or particulate resin, an organic material, or the like is dispersed into an inorganic material can be used for the substrate 4001 or the like.

Furthermore, a single-layer material or a material in which a plurality of layers are stacked can be used for the substrate 4001 or the like. For example, a material in which a base and an insulating film or the like that prevents diffusion of impurities contained in the base are stacked can be used for the substrate 4001 or the like. Specifically, a material in which glass and one or a plurality of films selected from a silicon oxide layer, a silicon nitride layer, a silicon oxynitride layer, and the like that prevent diffusion of impurities contained in the glass are stacked can be used for the substrate 4001 or the like. Alternatively, a material in which a resin and a silicon oxide film, a silicon nitride film, a silicon oxynitride film, or the like that prevents diffusion of impurities that penetrate the resin are stacked can be used for the substrate 4001 or the like.

Specifically, a resin film, a resin plate, a layered material, or the like of polyester, polyolefin, polyamide, polyimide, polycarbonate, an acrylic resin, or the like can be used for the substrate 4001 or the like.

Specifically, a material containing polyester, polyolefin, polyamide (nylon, aramid, or the like), polyimide, polycarbonate, polyurethane, an acrylic resin, an epoxy resin, or a resin having a siloxane bond such as silicone can be used for the substrate 4001 or the like.

Specifically, polyethylene terephthalate (PET), polyethylene naphthalate (PEN), polyethersulfone (PES), acrylic, or the like can be used for the substrate 4001 or the like. Alternatively, a cyclo olefin polymer (COP), a cyclo olefin copolymer (COC), or the like can be used.

Alternatively, paper, wood, or the like can be used for the substrate 4001 or the like.

For example, a flexible substrate can be used as the substrate 4001 or the like.

Note that a method in which a transistor, a capacitor, or the like is directly formed on a substrate can be used. Alternatively, for example, a method in which a transistor, a capacitor, or the like is formed on a substrate that is for use in the manufacturing process and has heat resistance to heat applied in the manufacturing process, and then the formed transistor, capacitor, or the like is transferred to the substrate 4001 or the like can be used. Accordingly, a transistor, a capacitor, or the like can be formed on a flexible substrate, for example.

(Substrate 4006)

For example, a material that can be used for the substrate 4001 can be used for the substrate 4006. For example, a light-transmitting material selected from materials that can be used for the substrate 4001 can be used for the substrate 4006. Alternatively, a material whose surface on one side is provided with an antireflective film with a thickness of 1 μm or less can be used for the substrate 4006. Specifically, a material in which three or more layers, preferably five or more layers, more preferably 15 or more layers of dielectrics are stacked can be used for the substrate 4006. This allows reflectivity to be as low as 0.5% or less, preferably 0.08% or less. Alternatively, a material with low birefringence selected from materials that can be used for the substrate 4001 can be used for the substrate 4006.

For example, aluminosilicate glass, tempered glass, chemically tempered glass, sapphire, or the like can be suitably used for the substrate 4006 that is provided on the side close to a user of the display panel. Thus, the display panel can be prevented from being broken or damaged by the use thereof.

For example, a resin film of a cyclo olefin polymer (COP), a cyclo olefin copolymer (COC), a triacetyl cellulose (TAC), or the like can be suitably used for the substrate 4006. As a result, the weight can be reduced. Alternatively, for example, the frequency of occurrence of breakage due to dropping or the like can be reduced.

Moreover, for example, a material with a thickness less than or equal to 0.7 mm and greater than or equal to 0.1 mm can be used for the substrate 4006. Specifically, a substrate polished for reducing the thickness can be used.

FIG. 11(A) illustrates a cross-sectional view of the case where a top-gate transistor is provided as the transistor 3431 illustrated in FIG. 10(A). Similarly, FIG. 11(B) illustrates a cross-sectional view of the case where a top-gate transistor is provided as the transistor 3232 illustrated in FIG. 10(B).

In each of the transistors 3431 and 3232 in FIGS. 11(A) and 11(B), the electrode 517 has a function of a gate, the electrode 510 has a function of one of a source and a drain, and the electrode 511 has a function of the other of the source and the drain.

For the details of other components in FIGS. 11(A) and 11(B), refer to the description of FIGS. 10(A) and 10(B).

As described above, with the use of the image receiving apparatus described in this embodiment, a low-resolution image data can be upconverted efficiently and a high-resolution image can be displayed.

Embodiment 3

In this embodiment, a semiconductor device that can be used in the NN (neural network) circuit described in the above embodiment is described.

<<Semiconductor Device>>

Figure 12:
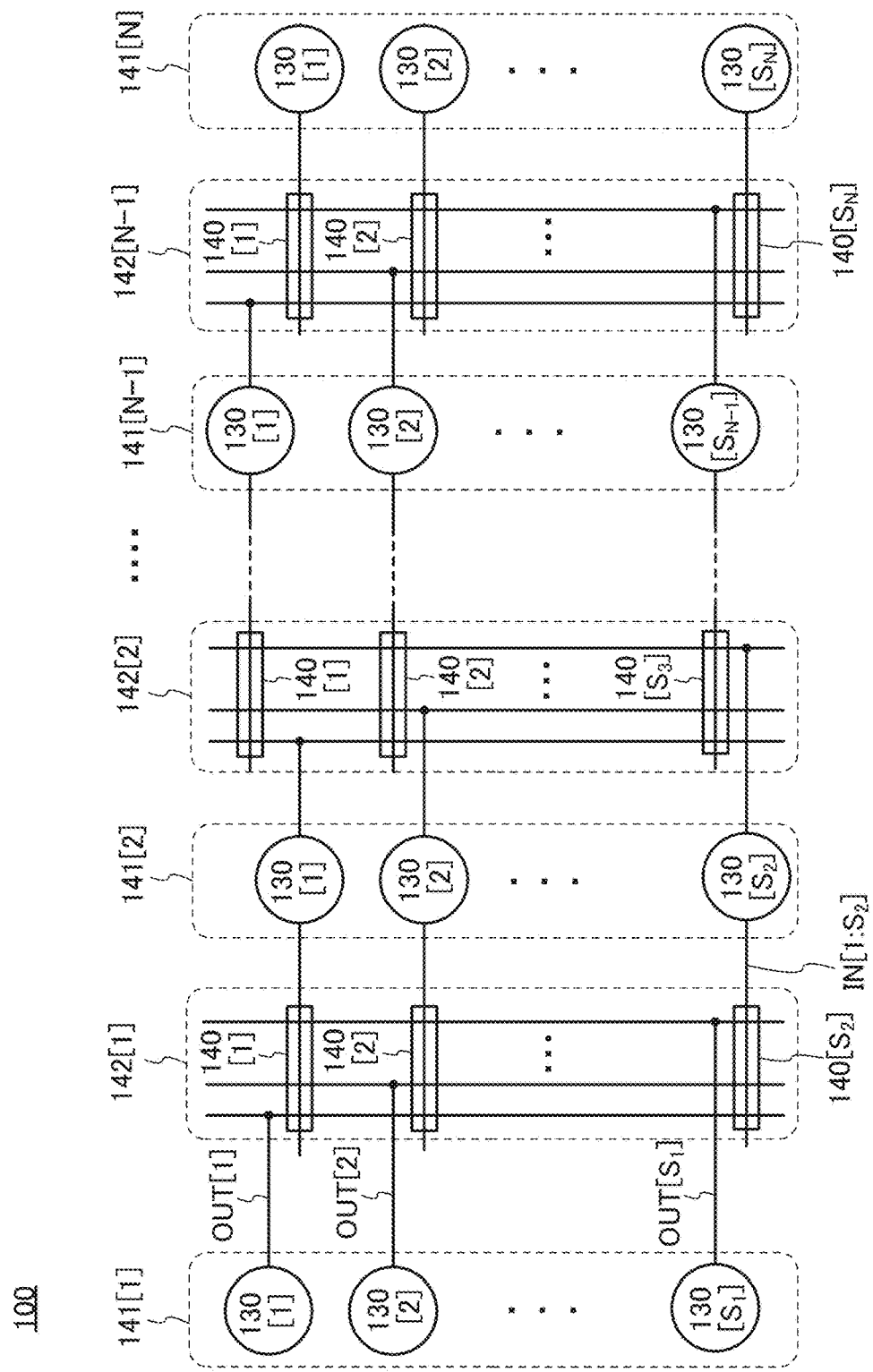
FIG. 12 A circuit diagram illustrating a configuration example of a semiconductor device.

FIG. 12 illustrates a structure of a semiconductor device 100 that can realize a variety of neural networks.

The semiconductor device 100 has a hierarchical structure consisting of arithmetic layers 141[1] to 141[N] and switch layers 142[1] to 142[N−1]. Note that N is an integer greater than or equal to 2.

The arithmetic layer 141[1] includes product-sum operation elements 130[1] to 130[$S_1$], and the arithmetic layer 141[N] includes product-sum operation elements 130[1] to 130[$S_N$]. The switch layer 142[1] includes programmable switches 140[1] to 140 [$S_2$], and the switch layer 142[N−1] includes programmable switches 140[1] to 140[$S_N$]. Note that $S_1$ to $S_N$ are each an integer greater or equal to 1. The switch layer 142 has a function of controlling a connection between two different arithmetic layers 141.

The programmable switch 140 has a function of controlling a connection between the plurality of product-sum operation elements 130 included in a first arithmetic layer 141 and the product-sum operation elements 130 included in a second arithmetic layer 141. For example, in FIG. 12, the programmable switch 140[$S_2$] has a function of controlling a connection between any one of the product-sum operation elements 130[1] to 130[$S_1$] included in the arithmetic layer 141[1] and the product-sum operation element 130[$S_2$] included in the arithmetic layer 141[2].

The hierarchical structure in FIG. 12 can correspond to the layered structure illustrated in FIG. 3. Note that in this specification, the product-sum operation element 130 is referred to as a neuron in some cases.

<<Product-Sum Operation Element>>

Figure 13:
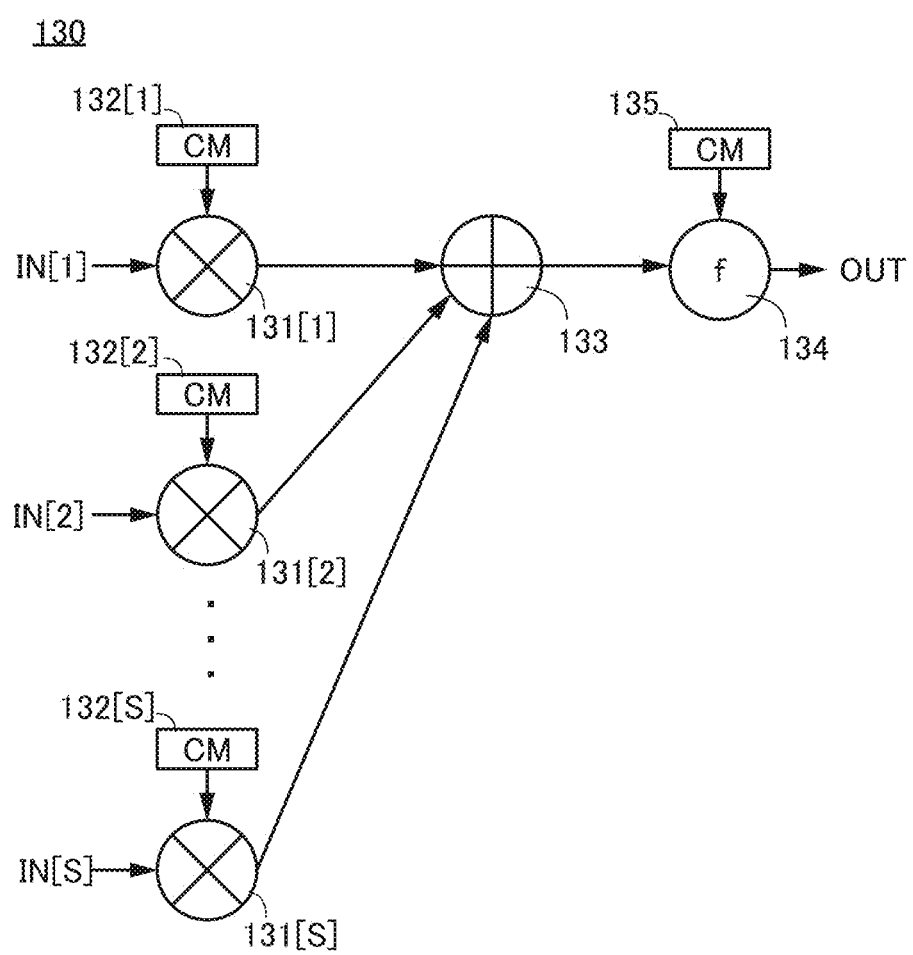
FIG. 13 A block diagram illustrating a structural example of a product-sum operation element.

FIG. 13 is a block diagram illustrating a structural example of the product-sum operation element 130. The product-sum operation element 130 consists of multiplier elements 131[1] to 131[S] corresponding to input signals IN[1] to IN[S], respectively; an adder element 133, an activation function element 134, CMs (configuration memories) 132[1] to 132[S], and a CM 135. Note that S is an integer greater than or equal to 1.

The multiplier element 131 has a function of multiplying data stored in the CM 132 by the input signal IN. A weight coefficient is stored in the CM 132.

The adder element 133 has a function of adding all the outputs (multiplication results) from the multiplier elements 131[1] to 131[S].

The activation function element 134 performs an operation on the output (product-sum operation result) from the adder element 133 based using a function defined by data stored in the CM 135 and outputs an output signal OUT. The function can be a sigmoid function, a tanh function, a softmax function, a ReLU function, a threshold function, or the like. These functions are implemented in the form of a table, broken line approximation, or the like, and the corresponding data is stored in the CM 135 as configuration data.

Note that the CMs 132[1:S] and the CM 135 preferably have their own writing circuits. Thus, an update of the data in the CMs 132[1:S] and an update of the data in the CM 135 can be independently performed. That is, the update of the data in the CMs 132[1:S] can be repeated a plurality of times without updating the data in the CM 135. Thus, during the learning by the neural network, only the update of the weight coefficients can be repeated a plurality of times, leading to efficient learning.

<<Programmable Switch>>

Figure 14A:
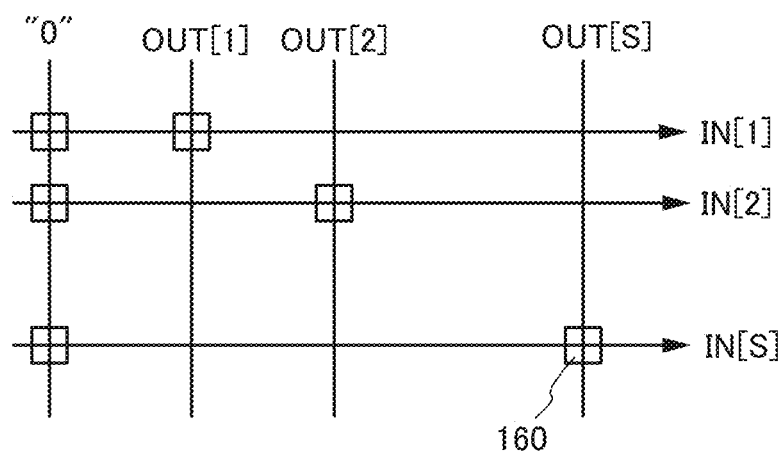
FIG. 14 Circuit diagrams illustrating configuration examples of a programmable switch.

FIG. 14(A) is a circuit diagram illustrating a configuration of the programmable switch 140. The programmable switch 140 includes a switch 160.

The programmable switch 140 has a function of connecting output signals OUT[1] to OUT[S] to the input signals IN[1] to IN[S]. For example, in FIG. 12, the programmable switch 140[$S_2$] has a function of controlling a connection between any one of the output signals OUT[1] to OUT[$S_1$] of the arithmetic layer 141[1] and the input signal IN[1:$S_2$] of the product-sum operation element 130[$S_2$] included in the arithmetic layer 141[2].

Furthermore, the programmable switch 140 has a function of controlling a connection between a signal "0" and the input signals IN[1] to IN[S] of the product-sum operation element 130.

<<Switch>>

Figure 14B:
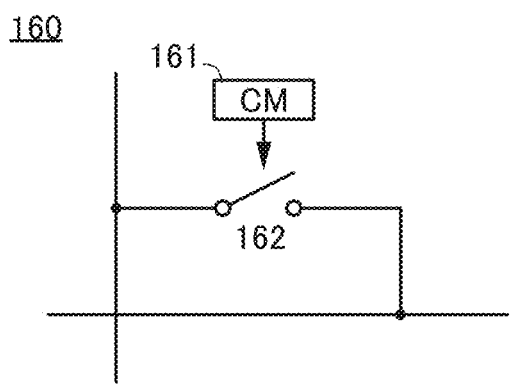

FIG. 14(B) is a circuit diagram illustrating a configuration example of the switch 160. The switch 160 includes a CM 161 and a switch 162. The switch 162 has a function of controlling conduction between OUT[i] and IN[i] (i is an integer greater than or equal to 1 and less than or equal to S). In addition, the switch 162 has a function of controlling conduction between "0" and IN[i]. Configuration data stored in the CM 161 controls on/off of the switch 162. A transistor can be used as the switch 162.

Note that when the product-sum operation element 130 does not use OUT[i] from the immediately preceding arithmetic layer 141 as an input, the product-sum element 130 connects IN[i] to "0". In this case, the power consumption can be reduced by stopping of power supply (performing power gating) to the multiplier element 131[i] corresponding to IN[i]. For example, in FIG. 12, in the case where the product-sum operation element 130[$S_2$] included in the arithmetic layer 141[2] does not use OUT[1] from the arithmetic layer 141[1] as an input, the product-sum operation element 130[$S_2$] connects its IN[1] to "0" to stop power supply to the multiplier element 131[1].

Furthermore, in the case where OUT[i] of the product-sum operation element 130 included in one arithmetic layer 141 is not connected to any product-sum operation element 130 included in the other arithmetic layers 141, power supply to the entire product-sum operation element 130 which outputs OUT[i] is stopped, so that power consumption can be reduced. For example, in FIG. 12, in the case where the product-sum operation element 130[$S_1$] included in the arithmetic layer 141[1] is not connected to any product-sum operation element 130 included in the other arithmetic layers 141, power supply to the entire product-sum operation element 130[$S_1$] is stopped.

In the above configuration, the configuration memory can be formed using a flash memory, a ReRAM, an MRAM, a PRAM, a FeRAM, or the like. Furthermore, the configuration memory can be formed using an OS memory. By using an OS memory as the configuration memory, the power consumption of the semiconductor device 100 can be drastically reduced.

For example, when the CMs 132[1] to 132[S] and the CM 135 illustrated in FIG. 13 are formed using OS memories, a low power consuming network can be formed using a small number of elements in the semiconductor device 100.

For example, when the CM 161 illustrated in FIG. 14(B) is formed using an OS memory, a low power consuming network can be formed using a small number of elements in the semiconductor device 100.

Furthermore, when the multiplier element 131 and the adder element 133 are analog product-sum operation elements, the number of transistors included in the product-sum operation element 130 can be reduced.

Moreover, when the input and output signals of the product-sum operation element 130 are analog signals, the number of wirings which form the network can be reduced.

The semiconductor device 100 in FIG. 12 can generate configuration data of the programmable switch 140 for a desired network structure and can perform learning based on the configuration data. In the case where the weight coefficient is updated by learning, a configuration in which changing only the configuration data of the weight coefficient repeatedly without changing the configuration data of the programmable switch 140 is effective. Therefore, the configuration data is preferably written to the CMs 132[1:S] included in the product-sum operation element 130 and the CM 135 included in the programmable switch 140 using different circuits.

Embodiment 4

In this embodiment, electronic devices to which the image processing method described in Embodiment 1 can be applied are described with reference to FIG. 15. By using the image processing method described in Embodiment 1 in the electronic devices described below, low-resolution image data can be unconverted and displayed on a display portion.

Figure 15A:
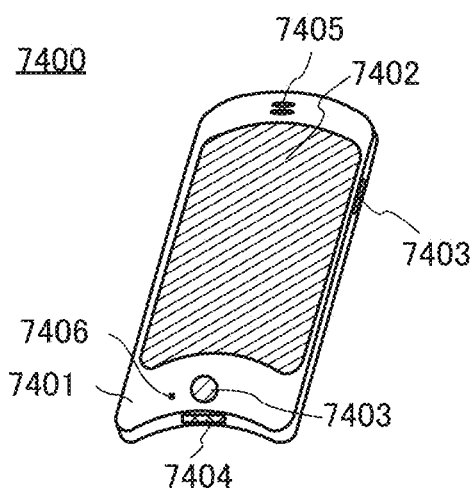
FIG. 15 Diagrams illustrating examples of electronic devices.

A mobile phone 7400 illustrated in FIG. 15(A) is provided with a display portion 7402 incorporated in a housing 7401, an operation button 7403, an external connection port 7404, a speaker 7405, a microphone 7406, and the like. When the display portion 7402 is touched with a finger or the like, information can be input to the mobile phone 7400. Various operations such as making a call and inputting letters can be performed by touching the display portion 7402 with a finger or the like. By operation of the operation button 7403, power can be turned on or off, and the type of an image displayed on the display portion 7402 can be switched. For example, switching from a mail editing screen to a main menu screen can be performed.

Figure 15B:
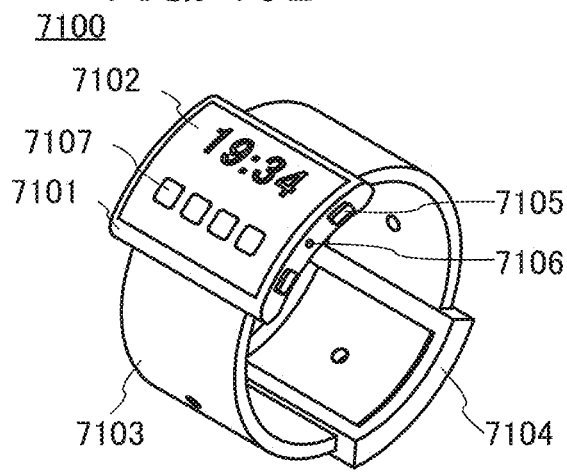

FIG. 15(B) illustrates an example of a watch-type portable information terminal. A portable information terminal 7100 illustrated in FIG. 15(B) is provided with a housing 7101, a display portion 7102, a band 7103, a buckle 7104, an operation button 7105, an input output terminal 7106, and the like. The portable information terminal 7100 is capable of executing a variety of applications such as mobile phone calls, e-mailing, viewing and editing text, music reproduction, Internet communication, and a computer game. The display surface of the display portion 7102 is provided to be curved, and display on the curved display surface can be performed. In addition, the display portion 7102 is provided with a touch sensor, and operation can be performed by touching the screen with a finger, a stylus, or the like. For example, by touching an icon 7107 displayed on the display portion 7102, application can be started.

With the operation button 7105, a variety of functions such as time setting, power on/off operations, on/off operations of wireless communication, setting and cancellation of a silent mode, and setting and cancellation of a power saving mode can be performed. For example, the functions of the operation button 7105 can be set freely by an operating system incorporated in the portable information terminal 7100. The portable information terminal 7100 can execute near field communication based on an existing communication standard. For example, mutual communication with a headset capable of wireless communication enables hands-free calling. Moreover, the portable information terminal 7100 is provided with the input output terminal 7106, and data can be directly transmitted to and received from another information terminal via a connector. In addition, charging via the input output terminal 7106 is possible. Note that the charging operation may be performed by wireless power feeding without through the input output terminal 7106.

Figure 15C:
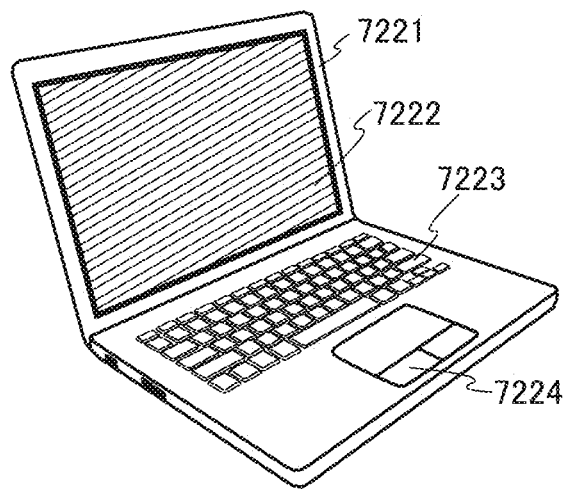

FIG. 15(C) illustrates a notebook type personal computer (PC). A PC 7200 illustrated in FIG. 15(C) includes a housing 7221, a display portion 7222, a keyboard 7223, a pointing device 7224, and the like.

Figure 15D:
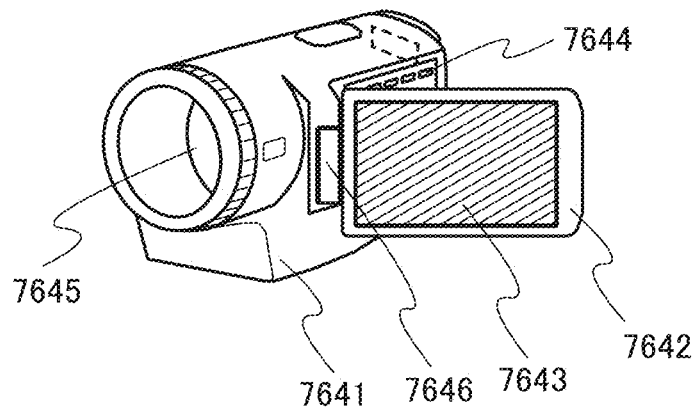

FIG. 15(D) illustrates a video camera 7600 which includes a first housing 7641, a second housing 7642, a display portion 7643, an operation key 7644, a lens 7645, a joint 7646, and the like.

Example 1

In this example, display results in the case where upconversion was performed by the method described in Embodiment 1 and an image corresponding to image data that had been subjected to the upconversion was displayed are described.

Figure 16A:
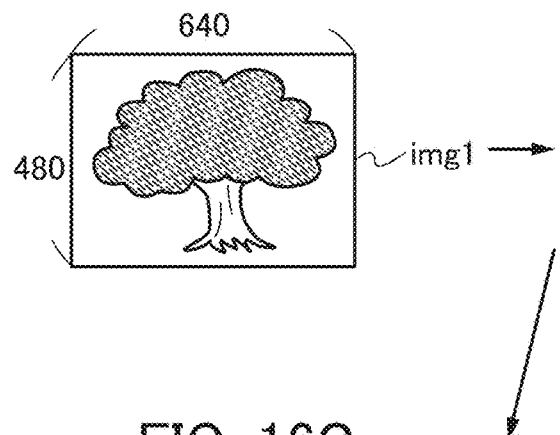
FIG. 16 Diagrams illustrating an example of an image processing method.
Figure 16B:
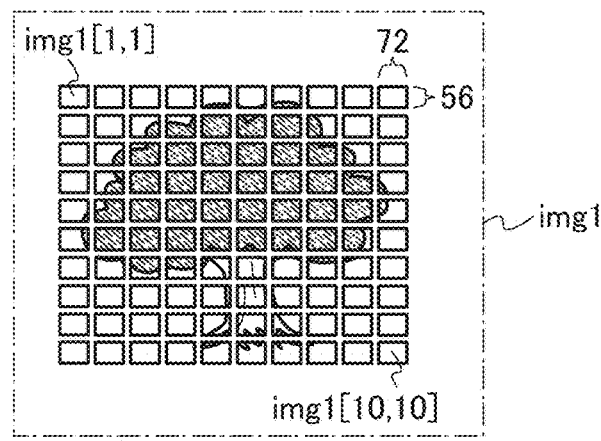

FIGS. 16(A), 16(B), 16(C), and 16(D) are figures that illustrate an operation that was executed in this example. In this example, first, as illustrated in FIG. 16(A), image data img1 with a resolution corresponding to VGA (640×480) was prepared. Next, as shown in FIG. 16(B), the image data img1 was divided into 10×10. In other words, the image data img1 was divided into image data img1[1,1] to image data img1[10,10]. Note that with Method 1 or Method 2 described later, the resolution of the image data img1[1,1] to the image data img1[10,10] is set to 72×56 as illustrated in FIG. 16(B), which was higher than the resolution 64×48.

Figure 16C:
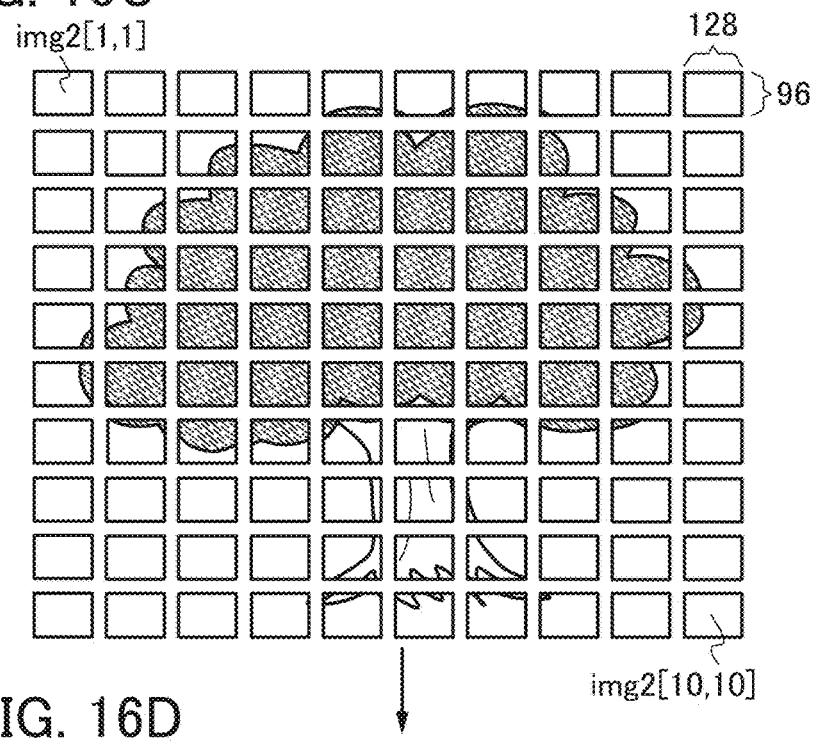
Figure 16D:
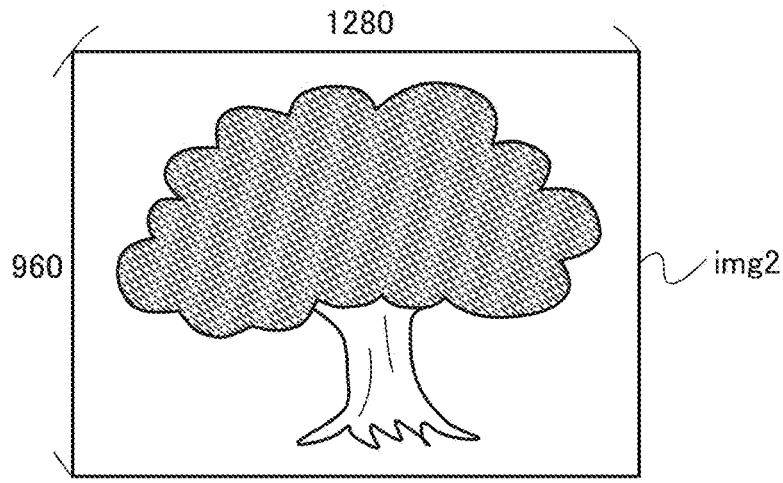

After that, each of the image data img1[1,1] to the image data img1[10,10] was upconverted using a CNN. Thus, as illustrated in FIG. 16(C), image data img2[1,1] to image data img2[10,10] with a resolution of 128×96 were generated. Note that in the CNN, the filter size of a weight filter was 3×3, the number of layers in a convolution layer was 8, and ReLU was used as an activation function. When image data img2[1,1] to image data img2[10,10] were combined, as illustrated in FIG. 16(D), the image data img2 with a resolution corresponding to Quad-VGA (1280×960) was generated, and an image corresponding to the image data img2 was displayed. By the above-described method, the image data img1 with a resolution of 640×480 was upconverted to the image data img2 with a resolution of 1280×960.

In this example, by Method 1 or Method 2, the resolution of each of the image data img1[1,1] to the image data img1[10,10] was set to 72×56, which was higher than 64×48. In Method 1, each of the resolutions of the image data img1[1,1] to the image data img1[10,10] was set to 72×56 by the method illustrated in FIGS. 1(B) and 1(C) and FIGS. 2(A) and 2(B). In Method 2, each of the resolutions of the image data img1[1,1] to the image data img1[10,10] was set to 72×56 by a method illustrated in FIGS. 17(A) and 17(B).

Figure 17A:
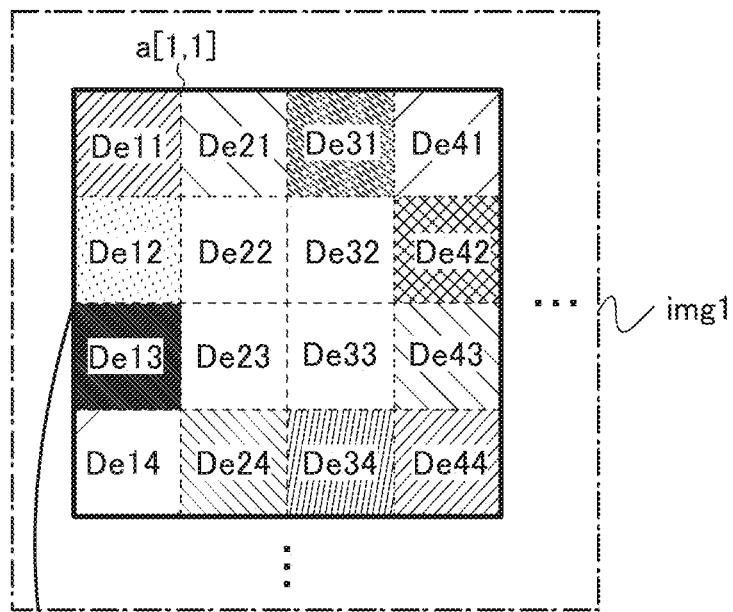
FIG. 17 Diagrams illustrating an example of an image processing method.
Figure 17B:

FIGS. 17(A) and 17(B) are diagrams illustrating an example of a method for setting the resolution of the image data img1[1,1] to 72×56, which is a method for obtaining a resolution higher than 64×48. FIG. 17(A) illustrates a structural example of image data a[1,1] included in image data a which forms the image data img1. In the case illustrated in FIG. 17(A), the image data a[1,1] includes pixel data De11, pixel data De21, pixel data De31, pixel data De41, pixel data De12, pixel data De22, pixel data De32, pixel data De42, pixel data De13, pixel data De23, pixel data De33, pixel data De43, pixel data De14, pixel data De24, pixel data De34, and pixel data De44.

FIG. 17(B) illustrates a structural example of the image data img1[1,1] generated on the basis of the image data a[1,1] with the structure illustrated in FIG. 17(A). By supplementing the outside of the image data a[1,1] with pixel data provided at the boundary portion of the image data a[1,1], the resolution of the image data img1[1,1] can be made higher than the resolution of the image data a[1,1]. In other words, by performing edge padding on the image data a[1,1], the resolution of the image data img1[1,1] can be made higher than the resolution of the image data a[1,1].

Note that FIG. 17(A) illustrates the case where the image data a[1,1] includes pixel data of 4×4, but the actual image data includes pixel data of 64×48. FIG. 17(B) illustrates the case where the image data a[1,1] is supplemented with one row of pixel data above and below each, and is supplemented with one column of pixel data on the left and the right each; however, in reality, the image data a[1,1] is supplemented with four rows of pixel data above and below each, and is supplemented with four columns of pixel data on the left and the right each. With the above manner, from the image data a[1,1] with a resolution of 64×48, the image data img1[1,1] with a resolution of 72×56 can be generated.

As described above, in this example, the image data img1 is divided into the image data img1[1,1] to the image data img1[10,10]. In the image data img1[1,1] to the image data img1[10,10], image data other than the image data img1[1,1] can be generated by a similar method of generating the image data img1[1,1].

Figure 18A:
FIG. 18 Images showing the display results.
Figure 18B:
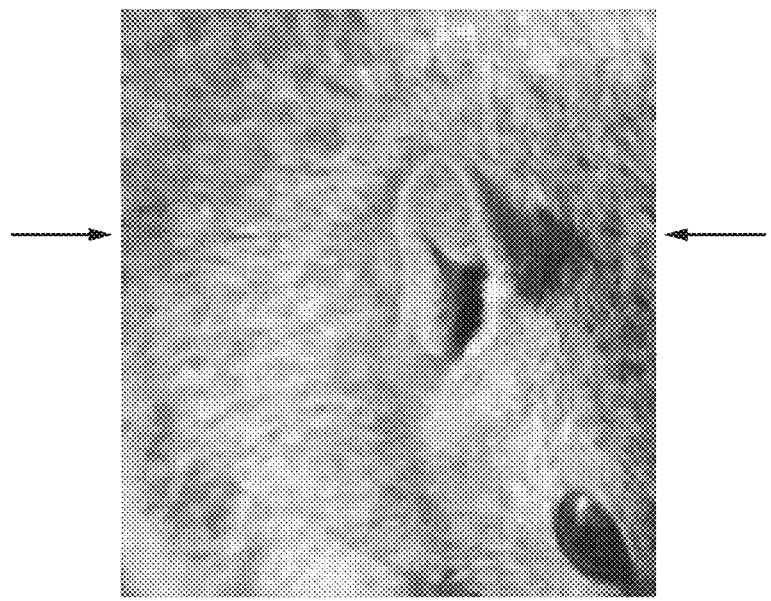

FIG. 18(A) shows the display result in the case where Method 1 was applied, and FIG. 18(B) shows the display result in the case where Method 2 was applied.

In FIG. 18(A), no distortion in an image was observed. Conversely, in FIG. 18(B), a distortion in the image was observed in the portion indicated by arrows. This results from occurrence of a distortion in pixel data at a connection portion of image data.

DESCRIPTION OF REFERENCE NUMERALS

10: image receiving apparatus, 11: computer network, 12: antenna, 13: server, 20: control portion, 21: system bus, 22: memory portion, 23: communication control portion, 24: image processing circuit, 25: decoder circuit, 26: video signal receiving portion, 27: timing controller, 28: SD, 28_A1: SD, 28_Am: SD, 28_B1: SD, 28_Bm: SD, 28_Bn: SD, 28_C1: SD, 28_Cm: SD, 28_D1: SD, 28_Dm: SD, 28_n: SD, 28_U1: SD, 28_Un: SD, 28_1: SD, 29: GD, 30: display panel, 30_A: display panel, 30_B: display panel, 30_C: display panel, 30_D: display panel, 31: pixel, 32_A1: NN circuit, 32_A10: NN circuit, 32_Am: NN circuit, 32_B1: NN circuit, 32_Bm: NN circuit, 32_Bn: NN circuit, 32_C1: NN circuit, 32_Cm: NN circuit, 32_D1: NN circuit, 32_Dm: NN circuit, 32_n: NN circuit, 32_U1: NN circuit, 32_Un: NN circuit, 32_1: NN circuit, 32_2: NN circuit, 32_3: NN circuit, 32_4: NN circuit, 32_5: NN circuit, 32_6: NN circuit, 32_7: NN circuit, 32_8: NN circuit, 32_9: NN circuit, 32_10: NN circuit, 41_n: display panel, 41_1: display panel, 41_2: display panel, 42_n: display panel, 42_1: display panel, 43_n: display panel, 43_1: display panel, 44_n: display panel, 44_1: display panel, 100: semiconductor device, 130: product-sum operation element, 131: multiplier element, 132: CM, 133: adder element, 134: activation function element, 135: CM, 140: programmable switch, 141: arithmetic layer, 142: switch layer, 160: switch, 161: CM, 162: switch, 510: electrode, 511: electrode, 512: semiconductor layer, 516: electrode, 517: electrode, 3125: light-emitting element, 3232: transistor, 3233: capacitor, 3431: transistor, 3432: liquid crystal element, 3435: node, 3436: node, 3437: node, 4001: substrate, 4005: sealant, 4006: substrate, 4008: liquid crystal layer, 4014: wiring, 4015: electrode, 4018: FPC, 4019: anisotropic conductive layer, 4021: electrode, 4030: electrode layer, 4031: electrode layer, 4032: insulating layer, 4033: insulating layer, 4035: spacer, 4102: insulating layer, 4103: insulating layer, 4110: insulating layer, 4111: insulating layer, 4112: insulating layer, 4510: partition wall, 4511: light-emitting layer, 4514: filler, 7100: portable information terminal, 7101: housing, 7102: display portion, 7103: band, 7104: buckle, 7105: operation button, 7106: input output terminal, 7107: icon, 7200: PC, 7221: housing, 7222: display portion, 7223: keyboard, 7224: pointing device, 7400: mobile phone, 7401: housing, 7402: display portion, 7403: operation button, 7404: external connection port, 7405: speaker, 7406: microphone, 7600: video camera, 7641: housing, 7642: housing, 7643: display portion, 7644: operation key, 7645: lens, 7646: joint

The invention claimed is:

1. An image processing method comprising:
generating a plurality of first image data by dividing low-resolution image data, one of the plurality of the first image data being second image data and another of the plurality of the first image data being third image data;
generating a plurality of fourth image data by adding each of a plurality of pixel data to each of the plurality of the first image data, wherein fifth image data is generated by adding first pixel data to the second image data and sixth image data is generated by adding second pixel data to the third image data;
generating a plurality of seventh image data by applying a convolutional neural network to the plurality of the fourth image data, wherein eighth image data is generated by using the fifth image data and ninth image data is generated by using the sixth image data; and
generating high-resolution image data by combining the plurality of the seventh image data,
wherein a first image is configured to be generated by using the high-resolution image data,
wherein a second image is configured to be generated by using the low-resolution image data,
wherein a resolution of the first image is higher than a resolution of the second image,
wherein the first image includes a first area and a second area,
wherein the first area is adjacent to the second area,
wherein the first area is configured to be generated by using the eighth image data,
wherein the second area is configured to be generated by using the ninth image data,
wherein the first pixel data comprises a part of the third image data, and
wherein the first pixel data further comprises data with a value of at least one of data 0 and a value in the second image data.

2. The image processing method according to claim 1, wherein the resolution of the first image is $n^2$ times as high as the resolution of the second image, n being an integer greater than or equal to 2.

3. An image processing method comprising:
generating second image data, third image data, fourth image data, and fifth image data by dividing first image data;
generating sixth image data, seventh image data, eighth image data, and ninth image data by adding first pixel data, second pixel data, third pixel data, and fourth pixel data to the second image data, the third image data, the fourth image data, and the fifth image data, respectively;
generating tenth image data, eleventh image data, twelfth image data, and thirteenth image data by applying a convolutional neural network to the sixth image data, the seventh image data, the eighth image data, and the ninth image data, respectively; and
generating fourteenth image data by combining the tenth image data, the eleventh image data, the twelfth image data, and the thirteenth image data,
wherein a first image is configured to be generated by using the fourteenth image data,
wherein a second image is configured to be generated by using the first image data,
wherein a resolution of the first image is higher than a resolution of the second image,
wherein the first image includes a first area, a second area, a third area, and a fourth area,
wherein the first area is adjacent to the second area and the third area,
wherein the fourth area is adjacent to the second area and the third area,
wherein the first area is configured to be generated by using the tenth image data,
wherein the second area is configured to be generated by using the eleventh image data,
wherein the third area is configured to be generated by using the twelfth image data,
wherein the fourth area is configured to be generated by using the thirteenth image data,
wherein the first pixel data comprises a part of the third image data and a part of the fourth image data,
wherein the second pixel data comprises a part of the second image data and a part of the fifth image data,
wherein the third pixel data comprises another part of the second image data and another part of the fourth image data,
wherein the fourth pixel data comprises another part of the third image data and another part of the fourth image data,
wherein the first pixel data further comprises data with a value of at least one of 0 data and a value in the second data,
wherein the second pixel data further comprises data with a value of at least one of 0 data and a value in the third data,
wherein the third pixel data further comprises data with a value of at least one of 0 data and a value in the fourth data, and
wherein the fourth pixel data further comprises data with a value of at least one of data 0 and a value in the fifth image data.

4. The image processing method according to claim 3, wherein the resolution of the first image is $n^2$ times as high as the resolution of the second image, n being an integer greater than or equal to 2.

* * * * *